United States Patent
Hermsen et al.

(10) Patent No.: US 11,747,891 B1
(45) Date of Patent: Sep. 5, 2023

(54) CONTENT OUTPUT MANAGEMENT IN A HEAD MOUNTED WEARABLE DEVICE

(71) Applicant: Google LLC, Mountain View, CA (US)

(72) Inventors: Walter Johan Silvester Hermsen, Waterloo (CA); Gregory Malcolm John Fitch, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/812,903

(22) Filed: Jul. 15, 2022

(51) Int. Cl.
*G06F 3/14* (2006.01)
*G06F 3/01* (2006.01)

(52) U.S. Cl.
CPC ............... *G06F 3/011* (2013.01); *G06F 3/14* (2013.01)

(58) Field of Classification Search
CPC . G06F 3/011; G06F 3/005; G06F 3/01; G06F 3/14
See application file for complete search history.

(56) References Cited

U.S. PATENT DOCUMENTS

| | | | |
|---|---|---|---|
| 2012/0011559 A1* | 1/2012 | Miettinen | G06F 21/31 726/1 |
| 2016/0198322 A1 | 7/2016 | Pitis | |
| 2020/0041803 A1 | 2/2020 | Reyes et al. | |
| 2020/0233095 A1 | 7/2020 | Adachi | |
| 2023/0023083 A1* | 1/2023 | Shelton, IV | H04L 41/12 |

* cited by examiner

*Primary Examiner* — Robert J Michaud
(74) *Attorney, Agent, or Firm* — Brake Hughes Bellermann LLP

(57) ABSTRACT

A system and method of selectively outputting content on a head mounted wearable computing device is provided. The system may determine a context associated with the operation of the head mounted wearable computing device, and selectively output content on the head mounted wearable computing device, or delay the output of content, based on the context. The content may be displayed in one or more designated portions of the display of the head mounted wearable computing device so as to reduce distraction to the user, and enhance situational awareness and situational safety during use of the head mounted wearable computing device.

20 Claims, 16 Drawing Sheets

CONTENT OUTPUT MANAGEMENT IN A HEAD MOUNTED WEARABLE DEVICE

TECHNICAL FIELD

This description relates in general to management of the output of content in a head mounted wearable device, and in particular to improvements in situational safety based on the selective output of content in the head mounted wearable device based on situational context.

BACKGROUND

Wearable devices may include head worn devices including, for example, glasses including smart glasses, headsets, earbuds and the like, wrist and/or hand worn devices including, for example, watches including smart watches, smart bracelets, smart rings and the like, smart pendants, fitness trackers, cameras, body sensors, and other such devices. In some situations, distraction due to, for example, user interaction with displayed content, incoming notifications and the like, may compromise safety. In the case of smart glasses, displayed content may not only cause a distraction, but may also occlude user visibility of the surroundings. In some situations, for example, professional and/or social interactions and the like, users may want to avoid these types of distractions so as to remain engaged in the interaction.

SUMMARY

In a first general aspect, a computer-implemented method includes determining a context associated with operation of a head mounted wearable device; determining a content output state of the head mounted wearable device based on the context and one or more situational safety factors associated with the context; and outputting content, by a display device of the head mounted wearable device, based on the content output state of the head mounted wearable device. Outputting the content may include in a first content output state, outputting the content in a display area of the head mounted wearable device; and in a second content output state, delaying output of the content.

In some implementations, determining the context includes obtaining data associated with the head mounted wearable device, the data including at least one of location data provided by the head mounted wearable device, image data provided by an image sensor of the head mounted wearable device, or position and orientation data provided by a position and orientation sensor of the head mounted wearable device. Obtaining the data associated with the head mounted wearable device may include obtaining at least one of location data, image data, position data or orientation data from a mobile computing device that is paired with the head mounted wearable device.

In some implementations, the computer-implemented method may also include determining applicability of the content to the context; outputting the content in response to a determination that the content is applicable to the context; and delaying output of the content in response to a determination that the content is not applicable to the context.

In some implementations, outputting the content includes outputting the content in a designated content display area within the display area of the head mounted wearable device, including identifying a portion of a display area of the head mounted wearable device as the designated content display area; displaying the content only in the designated content display area; and designating remaining portions of the display area of the head mounted display device as non-display areas; and restricting display of content in the non-display areas. Designating the remaining portions of the display area of the head mounted wearable device as non-display areas may include designating portions of the display area of the head mounted wearable device corresponding to the one or more situational safety factors as non-display areas; and restricting display of content in the non-display areas so as to maintain a user view through the non-display areas.

In some implementations, the computer-implemented method may also include detecting a change in the context in which the head mounted wearable device is operated; updating the context; and updating the content output state of the head mounted wearable device based on the updated context. In some implementations, the computer-implemented method may also include modifying a manner in which the content is output based on the updated context and the updated content output state. Modifying the manner in which the content is output may include at least one of simplifying an appearance of the content in response to a detected change in the one or more situational safety factors; changing a display position of the content in response to a detected change in the one or more situational safety factors; suspending output of the content in response to a detected change in the one or more situational safety factors; or resuming output of the content in response to a detected change in the one or more situational safety factors.

In some implementations, the first content output state is a state in which output of content in the designated content display area maintains situational safety based on the context in which the head mounted wearable device is operated and the one or more situational safety factors associated with operation of the head mounted wearable device. In some implementations, the second content output state is a state in which the delay of the output of content maintains situational safety based on the context in which the head mounted display is operated and the one or more situational safety factors associated with the operation of the head mounted wearable device.

In another general aspect, a non-transitory computer-readable medium stores executable instructions that, when executed by at least one processor of a computing device, cause the at least one processor to determine a context associated with operation of a head mounted wearable device; determine a content output state of the head mounted wearable device based on the context and one or more situational safety factors associated with the context; and output content, by a display device of the head mounted wearable device, based on the content output state of the head mounted wearable device. Outputting the content may include in a first content output state, output the content in a display area of the head mounted wearable device; and in a second content output state, delay output of the content.

In some implementations, the instructions cause the at least one processor to obtain data associated with the head mounted wearable device, the data including at least one of location data provided by at least one of the head mounted wearable device or a mobile computing device paired with the head mounted wearable device; image data provided by an image sensor of the head mounted wearable device; or position and orientation data provided by a position and orientation sensor of at least one or the head mounted wearable device or the mobile computing device.

In some implementations, the instructions cause the at least one processor to determine applicability of the content to the context; output the content in response to a determination that the content is applicable to the context; and delay output of the content in response to a determination that the content is not applicable to the context.

In some implementations, the instructions cause the at least one processor to identify a portion of that display area of the head mounted wearable device as a designated content display area; display the content only in the designated content display area; designate remaining portions of the display area of the head mounted display device as non-display areas; and restrict display of content in the non-display areas.

In some implementations, the instructions cause the at least one processor to designate portions of the display area of the head mounted wearable device corresponding to the one or more situational safety factors as non-display areas; and restrict display of content in the non-display areas so as to maintain a user view through the non-display areas.

In some implementations, the instructions cause the at least one processor to detect a change in the context in which the head mounted wearable device is operated; update the context; update the content output state of the head mounted wearable device based on the updated context; and modify a manner in which the content is output based on the updated context and the updated content output state. In some examples, the instructions cause the at least one processor to modify the manner in which the content is output, including simplify an appearance of the content in response to a detected change in the one or more situational safety factors; change a display position of the content in response to a detected change in the one or more situational safety factors; suspend output of the content in response to a detected change in the one or more situational safety factors; or resume output of the content in response to a detected change in the one or more situational safety factors.

In some implementations, the first content output state is a state in which output of content in the display area maintains situational safety based on the context in which the head mounted wearable device is operated and the one or more situational safety factors associated with operation of the head mounted wearable device.

In some implementations, the second content output state is a state in which the delay of the output of content maintains situational safety based on the context in which the head mounted display is operated and the one or more situational safety factors associated with the operation of the head mounted wearable device.

The details of one or more implementations are set forth in the accompanying drawings and the description below. Other features will be apparent from the description and drawings, and from the claims.

DETAILED DESCRIPTION

This disclosure relates to systems and methods for improving safety in the use of wearable devices. In some examples, systems and methods disclosed herein may improve safety in the use of wearable devices by reducing user distraction, particularly in situations in which user distractions may pose a hazard. In some examples, the systems and methods may selectively determine whether or not to output information to the user via the wearable device, based on a determination of a context in which the wearable device is operated. In some examples, the systems and methods may use the determination of context to determine whether the wearable device is in a first content output state, in which content may be output as it becomes available; or a second content output state, in which only pertinent, or applicable, content is output, in designated portions of an output device and/or in modified manner and/or form; or a third content output state, in which output of content is delayed or suspended. In some examples, the systems and methods may make a determination of how and/or where to output information to the user, based on the determination of the context in which the wearable device is used. Systems and methods, in accordance with implementations described herein, may adapt the output of information to the user based on the context in which the wearable device is used and the information to be output, so as to improve safety in the use of the wearable device.

Hereinafter, systems and methods, in accordance with implementations described herein, will be described with respect to safety associated with the use of a wearable device in the form of a head mounted wearable device, such as smart glasses having display capability and/or computing capability, simply for purposes of discussion and illustration. The principles to be described herein may be applied to other types of wearable devices, and in particular to other types of wearable devices in which the selective output of information to the user, based on the current context in which the wearable device is used, may improve safety in the use of the wearable device.

Figure 1:
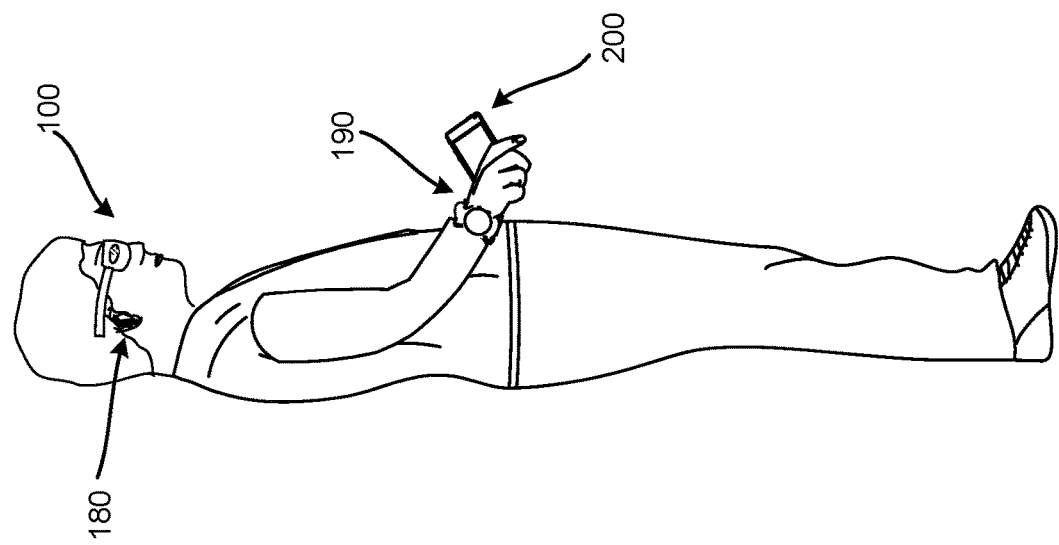
FIG. 1 is a third person view of a user in an ambient environment.

FIG. 1 is a third person view of a user, including various mobile devices. The example mobile devices include various example wearable devices including a first wearable device 100 in the form of a head mounted wearable device, or glasses, such as smart glasses, worn on the head of the user, a second wearable device 180 in the form of ear buds worn in one or both ears of the user, and a third wearable device 190 in the form of a watch, such as a smart watch, worn on the wrist of the user. FIG. 1 includes a mobile device 200 held by the user, in the form of a handheld computing device such as a smart phone. In some examples, the first wearable device 100 and/or the second wearable device 180 and/or the third wearable device 190 and/or the mobile device 200 may include output capability including display output capability and/or audio output capability. In some examples, the first wearable device 100 and/or the second wearable device 180 and/or the third wearable device 190 and/or the mobile device 200 may include computing and/or processing capability. In some examples, the first wearable device 100 and/or the second wearable device 180 and/or the third wearable device 190 and/or the mobile device 200 can access additional computing and processing resources, via a network and/or available locally on the mobile device 200 and/or one of the wearable devices 100, 180, 190. In some examples, the wearable devices 100, 180, 190 and the mobile device 200 can communicate with each other and/or with the additional resources to exchange information, to receive and transmit input and/or output, and the like. The principles to be described herein may be applied to other types of wearable devices and/or mobile devices not specifically shown in FIG. 1.

Hereinafter, systems and methods will be described with respect to the improvement of safety associated with the operation of the first example wearable device 100 in different contextual situations, alone or together with the example mobile device 200, for purposes of discussion and illustration. Principles to be described herein may be applied to achieve improvement of safety associated with the operation of other types of wearable devices, alone or together with the example mobile device 200 and/or other types of mobile devices.

Figure 2A:
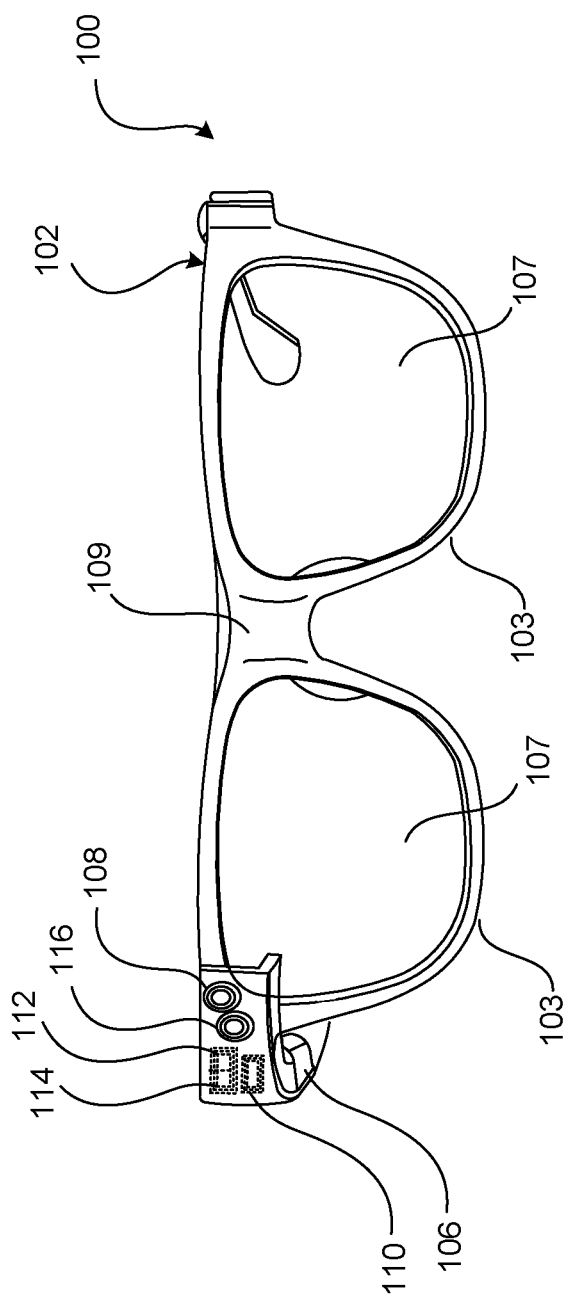
FIG. 2A is a front view.
Figure 2B:
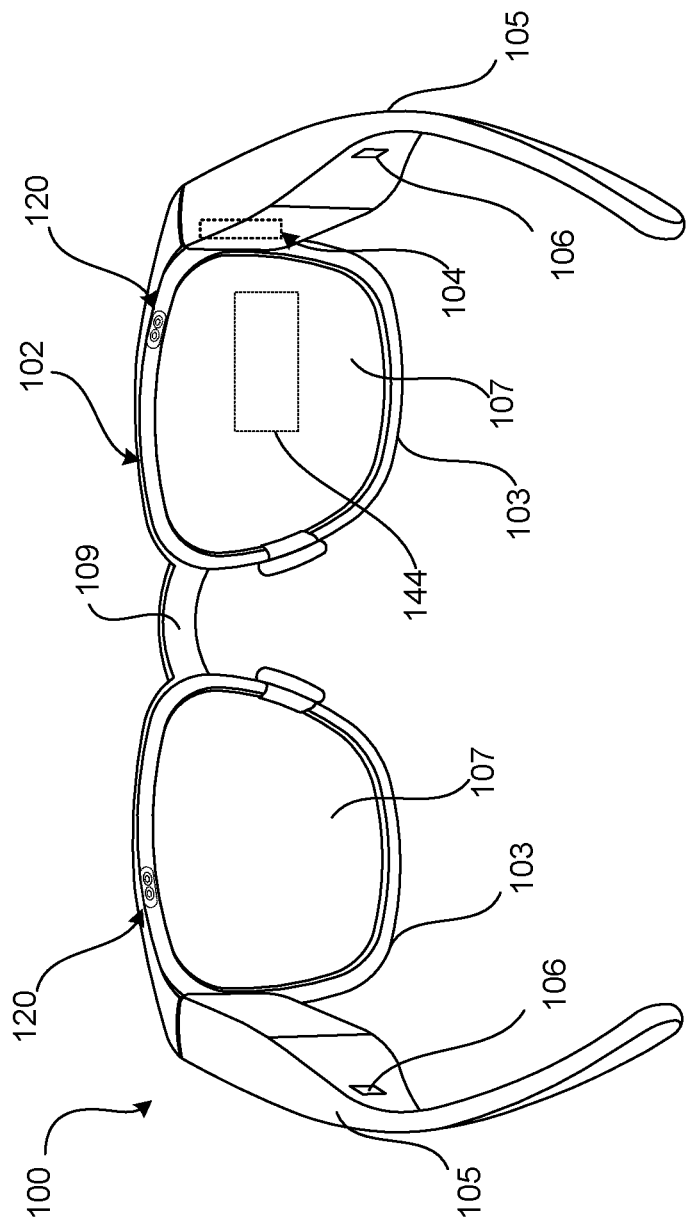
FIG. 2B is a rear view, of an example wearable device shown in FIG. 1.

An example head mounted wearable device 100 in the form of a pair of smart glasses is shown in FIGS. 2A and 2B, for purposes of discussion and illustration. In particular, FIG. 2A is a front view, and FIG. 2B is a rear view, of the example head mounted wearable device 100. The example head mounted wearable device 100 includes a frame 102 having rim portions 103 surrounding glass portions 107, or lenses 107, and arm portions 105 coupled to a respective rim portion 103. In some examples, the lenses 107 may be corrective/prescription lenses. In some examples, the lenses 107 may be glass portions that do not necessarily incorporate corrective/prescription parameters. A bridge portion 109 may connect the rim portions 103 of the frame 102.

The example wearable device 100 shown in FIGS. 2A and 2B, includes a display device 104 that can output visual content, for example at an output coupler 144 so that the visual content may be visible to the user. In some examples, the output coupler 144 may be substantially coincident with the lens(es) 107. In this form, the wearable device 100 can also include an audio output device 106 (such as, for example, one or more speakers), an illumination device 108, a sensing system 110, a control system 112, at least one processor 114, and an outward facing image sensor 116, or camera 116.

In some examples, the display device 104 may include a see-through near-eye display. For example, the display device 104 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 107, next to content (for example, digital images, user interface elements, virtual content, and the like) generated by the display device 104. In some implementations, waveguide, hologram or other combiner optics may be used to depict content from the display device 104.

In some examples, a gaze tracking device 120 may detect and track eye gaze direction and movement. Data captured by the gaze tracking device 120 may be processed to detect and track gaze direction and movement as a user input. In some implementations, the sensing system 110 may include various sensing devices and the control system 112 may include various control system devices including, for example, one or more processors 114 operably coupled to the components of the control system 112. In some implementations, the control system 112 may include a communication module providing for communication and exchange of information between the wearable device 100 and other external devices.

The example wearable device 100 can include more, or fewer features than described above. The principles to be described herein are applicable to a head mounted wearable device with or without corrective lenses.

Figure 2C:
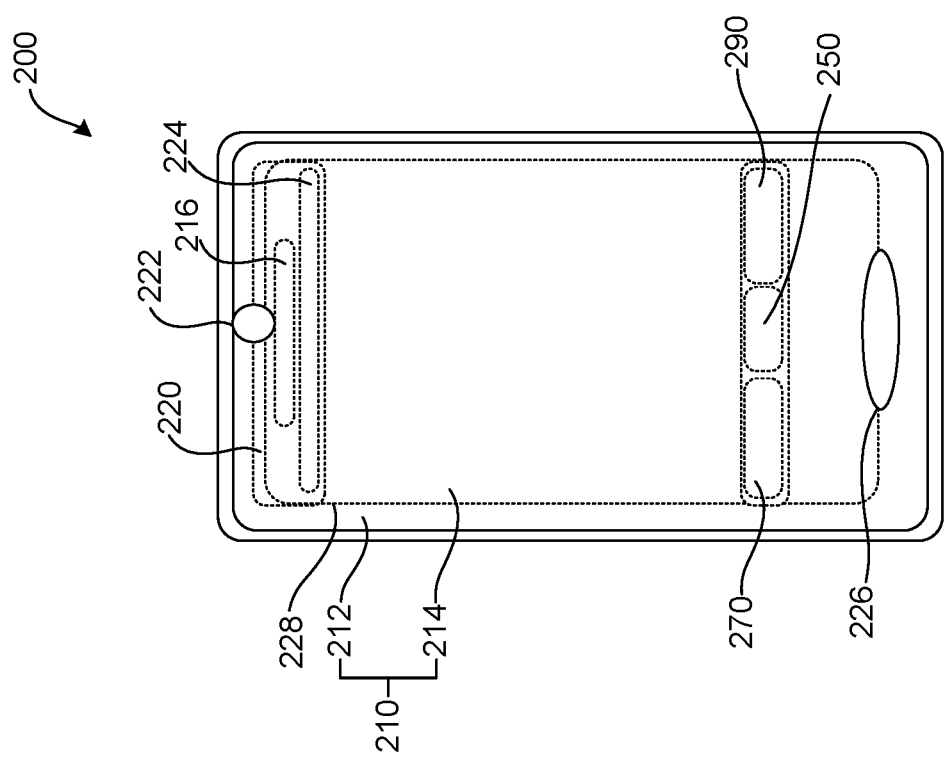
FIG. 2C is a front view of an example mobile device shown in FIG. 1.

FIG. 2C is a front view of the example mobile device 200 shown in FIG. 1. The example mobile device 200 may include an interface device 210. In some implementations, the interface device 210 may function as an input device, including, for example, a touch surface 212 that can receive touch inputs from the user. In some implementations, the interface device 210 may function as an output device, including, for example, a display portion 214 allowing the interface device 210 to output information to the user. In some implementations, the interface device 210 can function as an input device and an output device. The example mobile device 200 may include an audio output device 216, or speaker, that outputs audio signals to the user.

The example mobile device 200 may include a sensing system 220 including various sensing system devices. In some examples, the sensing system devices include, for example, one or more image sensors, one or more position and/or orientation sensors, one or more audio sensors, one or more touch input sensors, and other such sensors. The example mobile device 200 shown in FIG. 2C includes an image sensor 222 included in a front facing camera of the mobile device 200. The example mobile device 200 may include additional image sensors such as, for example, a world facing camera. The example mobile device 200 shown in FIG. 2C includes an inertial measurement unit (IMU) 224 including, for example, position and/or orientation and/or acceleration sensors such as, for example, an accelerometer, a gyroscope, a magnetometer, and other such sensors that can provide position and/or orientation and/or acceleration data. The example mobile device 200 shown in FIG. 2C includes an audio sensor 226 that can detect audio signals, for example, for processing as user inputs. The example mobile device 200 shown in FIG. 2C includes a touch input sensor 228, for example corresponding to the touch surface 212 of the interface device 210. The touch input sensor 228 can detect touch input signals for processing as user inputs. The example mobile device 200 may include a control system 270 including various control system devices. The example mobile device 200 may include a processor 290 to facilitate operation of the mobile device 200. The example mobile device 200 may include a communication module 250 providing for a connection to a network, for communication with other devices external to the example mobile device 200 (such as, for example, the example wearable device 100 and other such devices), and the like. In some examples. access to the network may be shared with external devices such as the example wearable device 100 via the example mobile device 100.

Systems and methods, in accordance with implementations described herein, may provide for the determination of contextual information associated with a current use of the wearable device. In some examples, the contextual information may be taken into account when determining whether to output content to the user, or to delay the output of the content to the user. In some examples, the contextual information may be taken into account when determining a manner in which the content is output to the user. In an example in which the wearable device is a head mounted wearable device (such as the wearable device 100 shown in FIGS. 1, 2A and 2B), the contextual information may be used to determine, for example, if the output of the content could pose a distraction to the user, if the output of the content is pertinent, or applicable to the user at the particular time based on the contextual information, if the output of the content can be adapted so that output of the content minimizes distraction from the user's situational awareness, or avoid occlusion of objects in front of the user and the like. Systems and methods, in accordance with implementations described herein, provide for the selective output of content by the wearable device 100 in a manner so as to help the user to maintain situational awareness, and situational safety.

Figure 3:
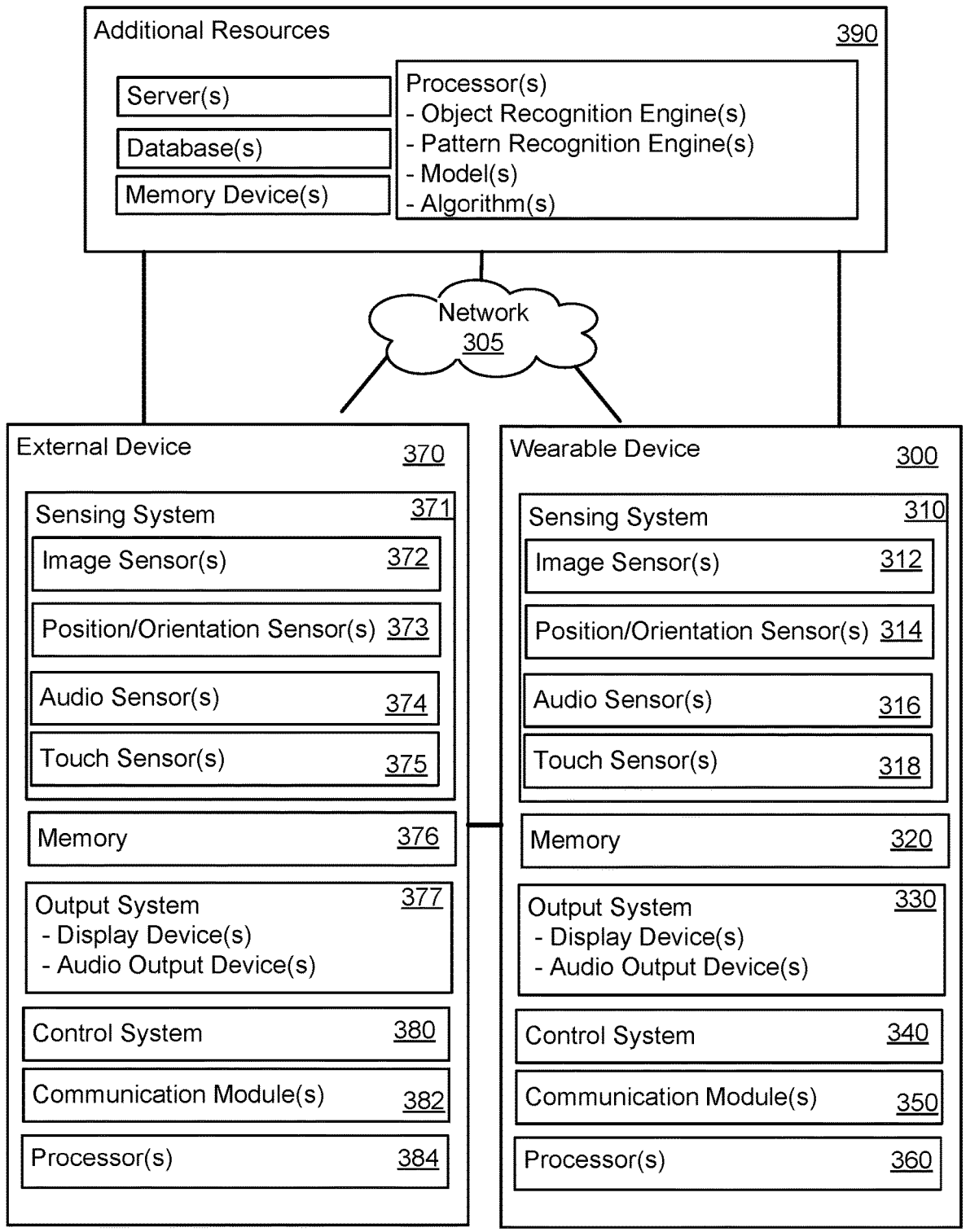
FIG. 3 is a block diagram of a system, in accordance with implementations described herein.

FIG. 3 is a block diagram of an example system for performing the systems and methods described herein. The system may include one or more computing devices. An example computing device 300 in the form of a wearable device (such as the head mounted wearable device 100 shown in FIGS. 1, 2A and 2B) is included in the example system shown in FIG. 3. The computing device 300 can operate under the control of a control system 340. The computing device 300 can communicate with one or more external devices 370 (such as, for example, another wearable computing device, another mobile computing device such as the mobile device 200 shown in FIGS. 1 and 2C, and the like) either directly (via wired and/or wireless communication), or via a network 305. In some implementations, the computing device 300 includes a communication module 350 to facilitate external communication. In some implementations, the computing device 300 includes a sensing system 310 including various sensing system components including, for example one or more image sensors 312, one or more position/orientation sensor(s) 314 (including for example, an inertial measurement unit, accelerometer, gyroscope, magnetometer and the like), one or more audio sensors 316 that can detect audio input, one or more touch input sensors 318 that can detect touch inputs, and other such sensors. The computing device 300 can include more, or fewer, sensing devices and/or combinations of sensing devices.

In some examples, the image sensor(s) 312 may include, for example, cameras such as, for example, outward, or world facing cameras, and the like that can capture still and/or moving images of an environment outside of the computing device 300. The still and/or moving images may be displayed by a display device of an output system 330, and/or transmitted externally via the communication module 350 and the network 305, and/or stored in a memory 320 of the computing device 300. The computing device 300 may include one or more processor(s) 360. The processors 360 may include various modules or engines configured to perform various functions. In some examples, the processor(s) 360 may include object classification module(s), pattern classification module(s), configuration identification modules(s), and other such processors. The processor(s) 360 may be formed in a substrate configured to execute one or more machine executable instructions or pieces of software, firmware, or a combination thereof. The processor(s) 360 can be semiconductor-based including semiconductor material that can perform digital logic. The memory 320 may include any type of storage device that stores information in a format that can be read and/or executed by the processor(s) 360. The memory 320 may store applications and modules that, when executed by the processor(s) 360, perform certain operations. In some examples, the applications and modules may be stored in an external storage device and loaded into the memory 320.

The computing device 300 can access additional resources 390 to facilitate the determination of numerous factors to be taken into account in the selective output of content to the user via the computing device 300. In some examples, the additional resources 390 are available locally, on the computing device 300. In some examples, the additional resources 390 are available to the computing device 300 via the network 305. In some examples, the additional resources 390 are available to the computing device via the external device 370. In some examples, some of the additional resources 390 are available locally on the computing device 300, and some of the additional resources are available via the network 305 and/or via the external device 370. The additional resources 390 may include, for example, server computer systems, processors, databases, memory storage, and the like. In some examples, the additional resources 390 may include various processing engines and/or modules, models (including machine learning models), algorithms and the like. In some examples, the additional resources 390 may include object and/or pattern classification engines. In some examples, the object and/or pattern classification engines may detect and/or identify one or more features in image data transmitted thereto for processing. The additional resources 390 may include one or more models and/or one or more algorithms. In some examples, the model(s) and/or algorithm(s) may be executed by the processors to determine contextual information associated with the use of one or more of the computing devices included in the system, application of rules for the output of information, the form and/or manner in which the information is output, changes in the form and/or the manner in which the information is output, and other such processes.

As noted above, in some examples, the external device 370 may be in communication with the computing device 300. For example, the external device 370 may be paired with, or operationally coupled with, the computing device 300. In some examples, the external device 370 may provide processing and/or computing resources to the computing device 300. In some examples, the external device may provide additional data to be used in the determination of context and the selective output of content to the user of the computing device 300. As noted above, in some examples, the external device 370 may be in the form of, for example, the mobile device 200 shown in FIGS. 1 and 2C. In some examples, the external device 370 may operate under the control of a control system 380. The external device 370 can communicate with one or more other devices directly (via wired and/or wireless communication), or via the network 305. The external device may include a communication module 382 to facilitate external communication. The external device 370 may include a sensing system 371 including various sensing system components including, for example one or more image sensors 372, one or more position/orientation sensor(s) 373 (including for example, an inertial measurement unit, accelerometer, gyroscope, magnetometer and the like), one or more audio sensors 374 that can detect audio input, one or more touch input sensors 375 that can detect touch inputs, and other such sensors.

The external device may include an output system 377 including one or more display devices that can output image content, and one or more audio output devices that can output audio content. The external device 370 may include one or more processor(s) 384. The processor(s) 384 may include various modules or engines configured to perform various functions. The processor(s) 384 may be formed in a substrate configured to execute one or more machine executable instructions or pieces of software, firmware, or a combination thereof. The processor(s) 384 can be semiconductor-based including semiconductor material that can perform digital logic. The memory 376 may include any type of storage device that stores information in a format that can be read and/or executed by the processor(s) 384. The memory 376 may store applications and modules that, when executed by the processor(s) 384, perform certain operations. In some examples, the applications and modules may be stored in an external storage device and loaded into the memory 376.

Hereinafter, systems and methods will be described with respect to a wearable device in the form of the example head mounted wearable device 100 shown in FIGS. 1, 2A and 2B. In some examples, systems and methods will be described with respect to the operation of the example head mounted wearable device 100 alone, or together with an external device such as the example mobile device 200 shown in FIGS. 1 and 2C. The principles to be described herein may be applied to other types of wearable devices and/or combinations of devices.

In some examples, a user wearing the example head mounted wearable device 100 may consume content output by the head mounted wearable device 100. In some examples, the content may be output in the form of image content output by the display device 104, and visible within a field of view of the user. In some examples, the content may be in the form of audio content output by the audio output device 106. In some examples, the content may include a combination of image content and audio content. In some situations, the output of content by the head mounted wearable device 100 may pose a distraction to the user or an occlusion of important objects in front of the user. In some situations, such a distraction or occlusion may compromise safety of the user and/or others in the vicinity of the user, or pose a hazard to the user and/or those in the vicinity of the user. These types of situations may warrant a delay in the output of information to the user, a modification in how information is output to the user, and the like, to preserve situational safety while the head mounted wearable device 100 is in use.

For example, content and/or notifications displayed by the display device 104 may be a distraction to the user, while the user is engaged in an activity which would otherwise benefit from the user's substantially undivided attention. In an example in which the user is, for example, walking in a somewhat crowded setting (i.e., pedestrian traffic, obstacles in the user's path, automobile traffic, and the like), content and/or notifications may cause a distraction to the user which may compromise the safety of the user and/or those in the vicinity of the user, particularly when the content and/or notifications is/are not pertinent, or applicable to the current activity. Similarly, in an example in which the user is driving, the display of content and/or notifications may cause a distraction which may compromise safety of the user and/or those in the vicinity of the user. Additionally, display of content and/or notifications while the user is engaged in an activity such as walking or driving may, in some situations, occlude portions of the field of view of the user, thus posing potential safety hazards. Numerous other types of environmental conditions that would benefit from reduced user distraction may similarly warrant a delay in the output of information to the user, a modification in how the information is output to the user, and the like. Such environmental conditions may include, for example, icy sidewalks and/or roads, precipitation that compromises visibility, and other such conditions.

Systems and methods, in accordance with implementations described herein, may determine a context associated with the use of a wearable device, and make a determination of whether to output information or to delay the output of information via the mobile device based on the determined context. When determining to output information, systems and methods, in accordance with implementations described herein, may determine a manner in which the information is output, based on the context associated with the use of the wearable device. For image based, or visual output, the manner in which the information is output may include, for example, determination of a visual area in which the information is output to minimize distraction and avoid occlusion of important objects in the field of view of the user. In some examples, this may include a modification in the content to be output, such as a consolidation and/or simplification of the information to be output, to reduce a size and/or a level of complexity of the information to be output. In some examples, this may include delaying the output of information until the context in which the wearable device is used has changed, and the output of information no longer causes a distraction or occlusion which may pose a safety issue for the user.

Figure 4A:
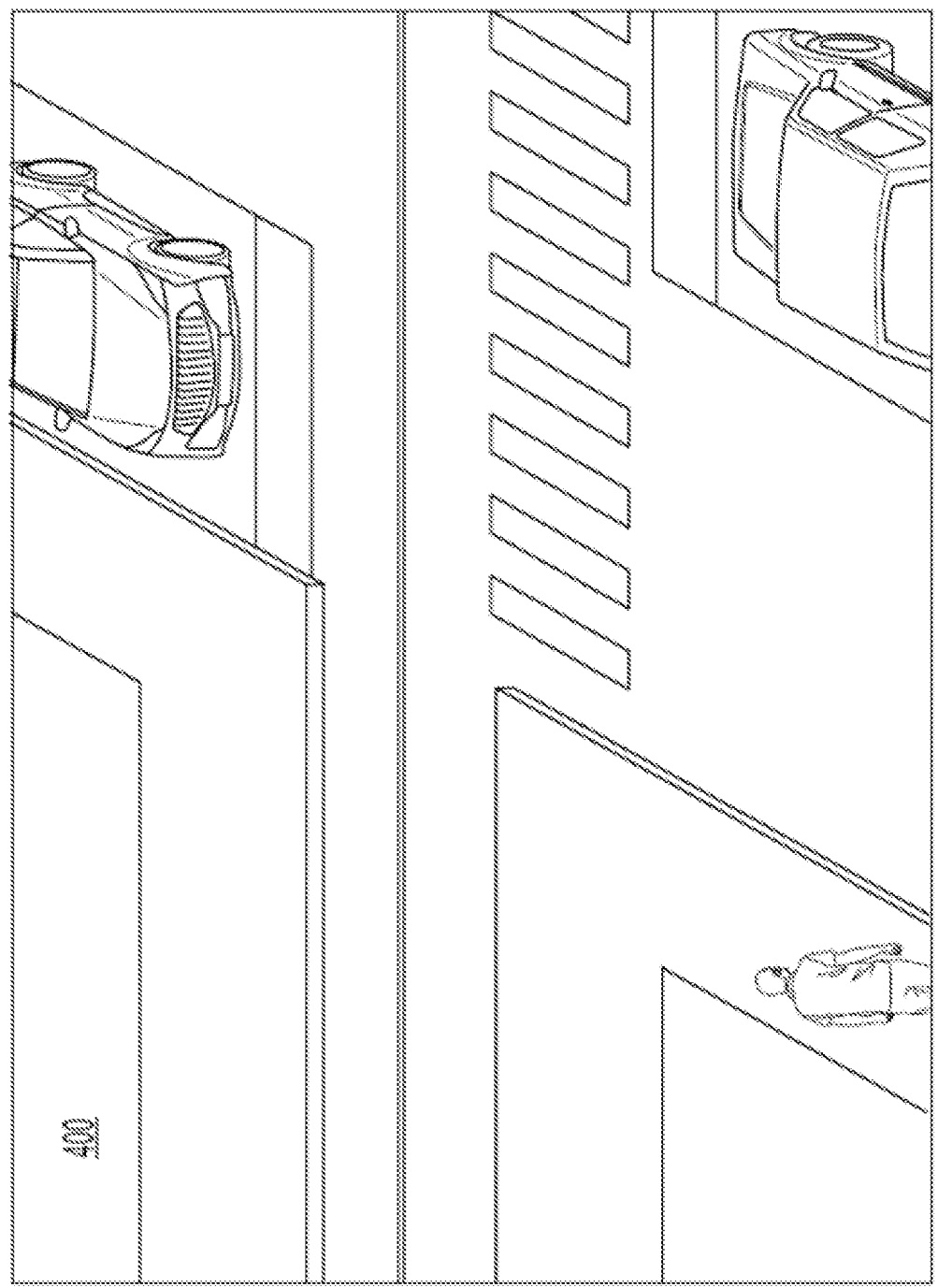
FIGS. 4A-4D illustrate operation of an example wearable device in a first example usage environment.
Figure 4B:
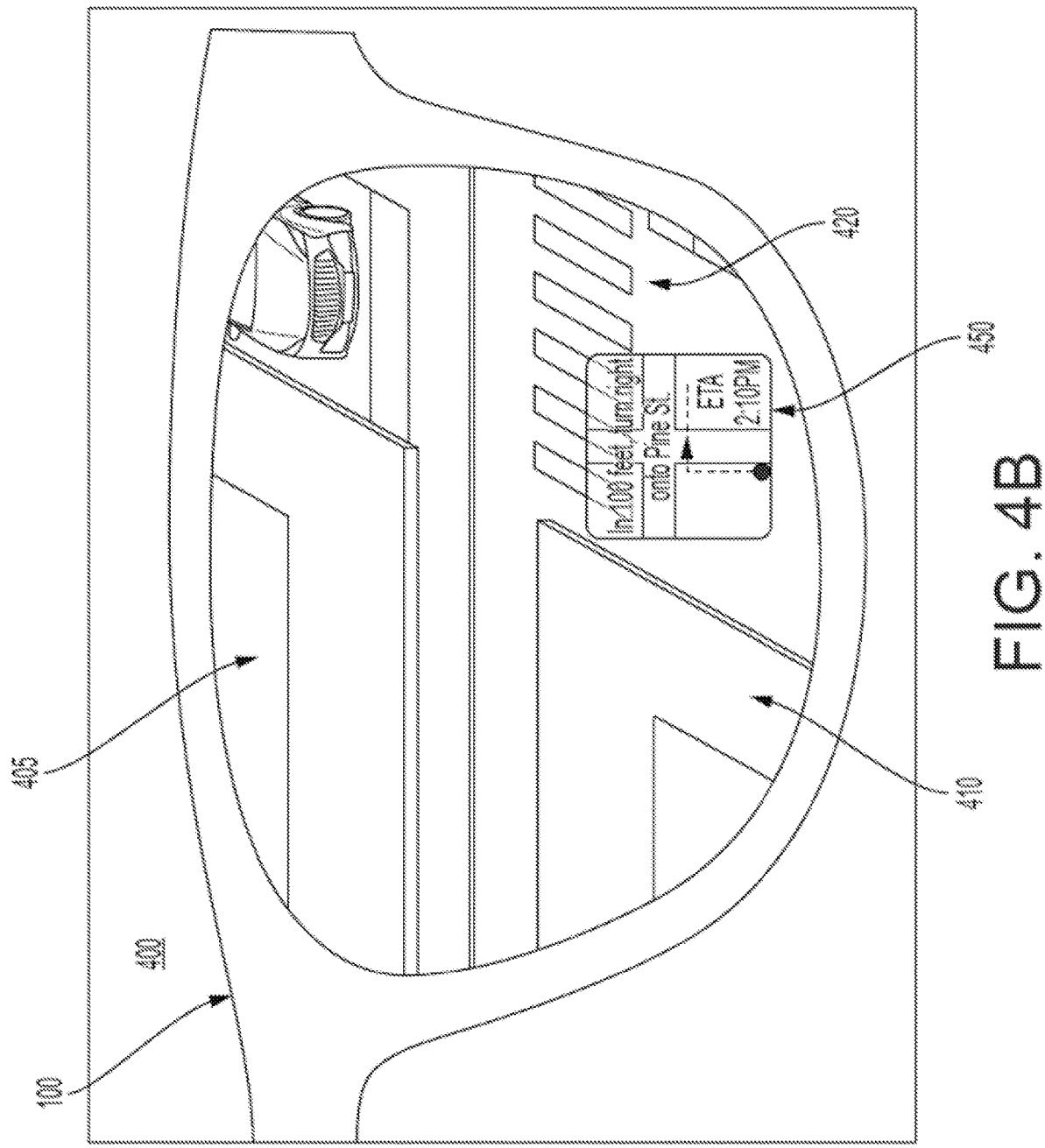
Figure 4C:
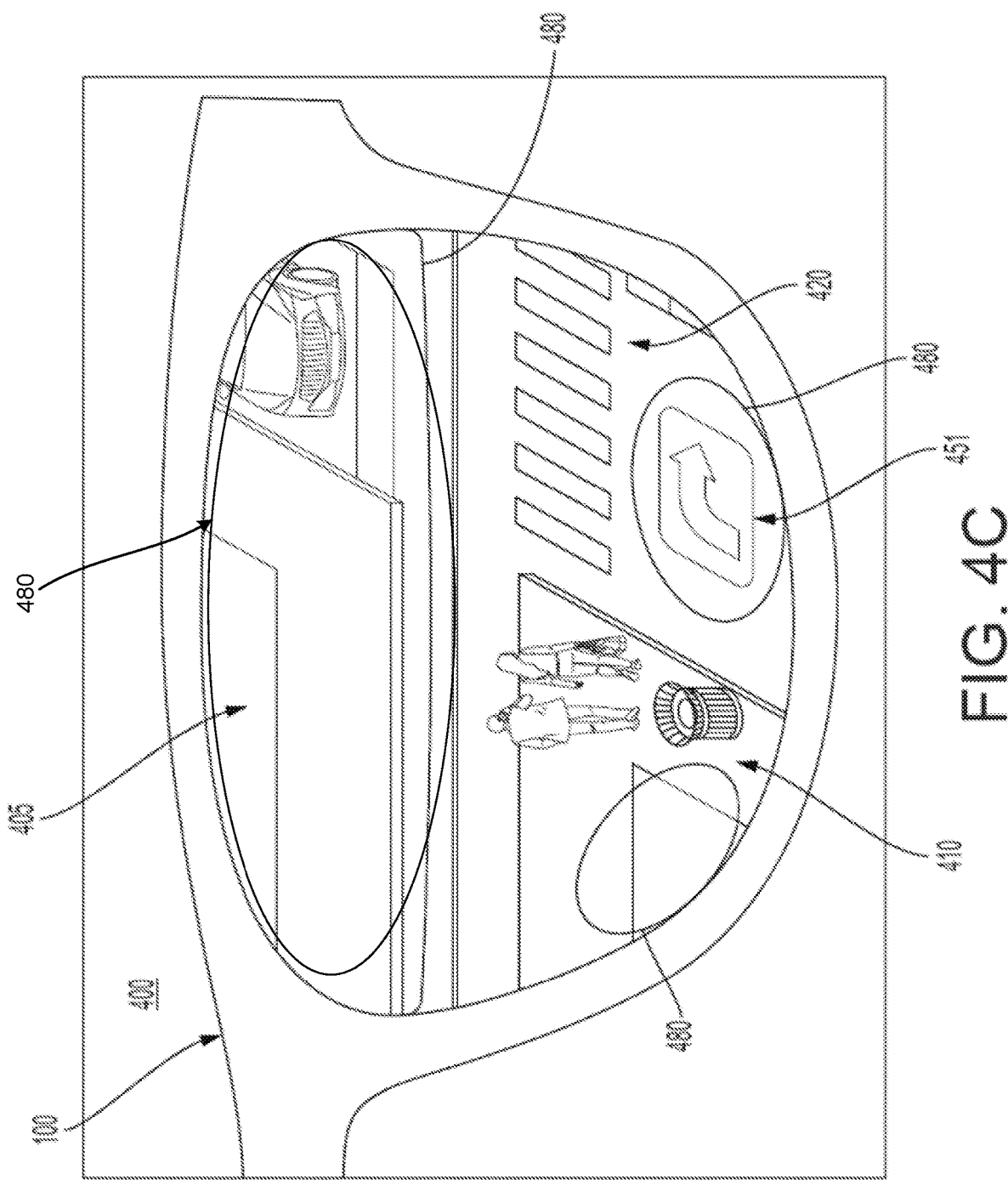
Figure 4D:
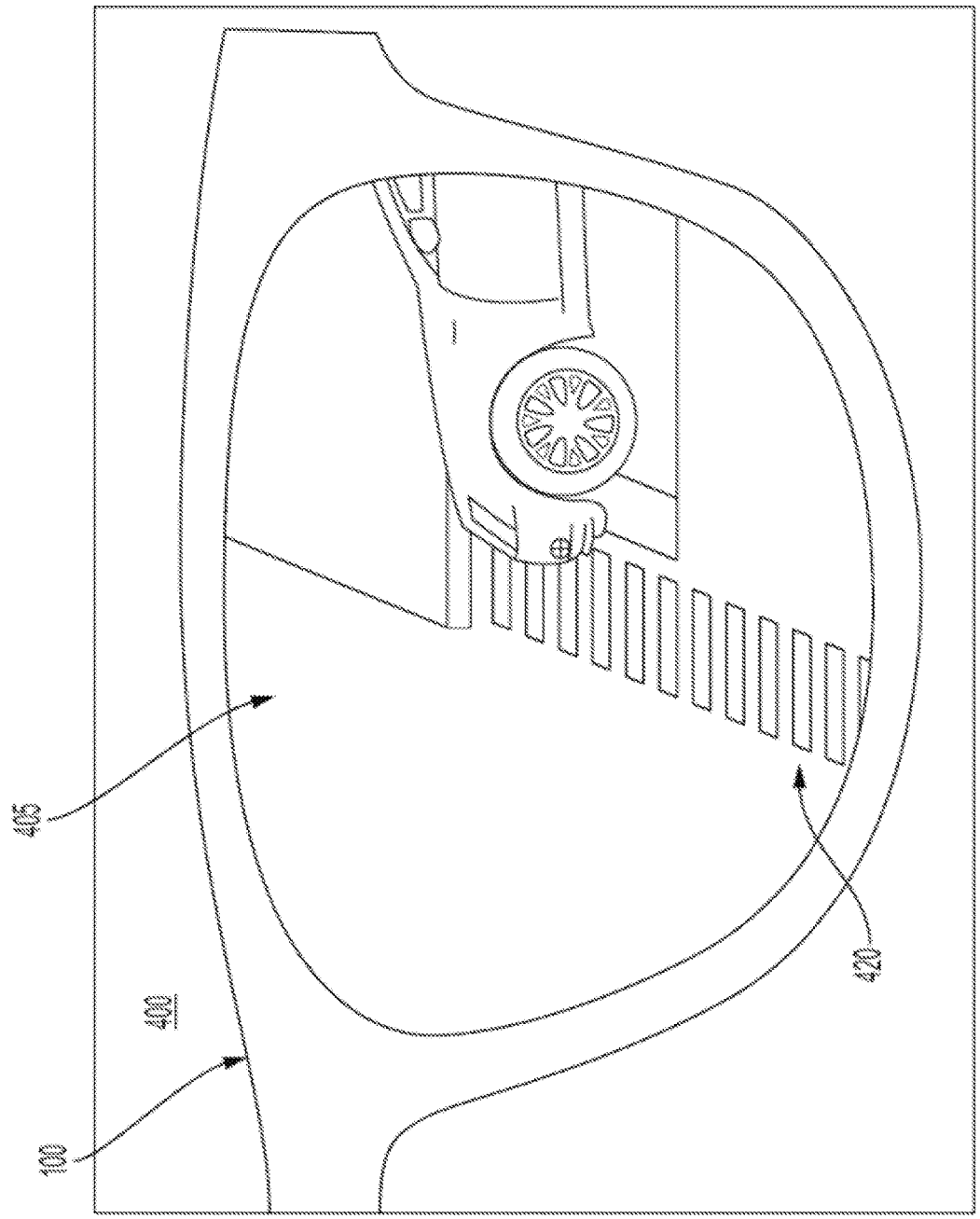

FIG. 4A is a third person view of a user in an ambient environment 400. In the example shown in FIG. 4A, the user is wearing the head mounted wearable device 100 (not shown in FIG. 4A). The handheld mobile computing device 200 (not shown in FIG. 4A) may be carried by the user. In some examples, the wearable device 100 and the mobile device 200 may be paired, or operably coupled. When in this state, the wearable device 100 and the mobile device 200 can communicate with each other, can exchange data and information, can share computing resources, and the like. In some examples, the wearable device 100 and the mobile device 200 may operate substantially independently. FIGS. 4B-4D are third person views of the user's view of the ambient environment 400, as viewed through one of the lenses 107 of the example wearable device 100. In particular, FIGS. 4B-4D illustrate a user view 405 of the ambient environment 400 through one of the lenses 107 of the head mounted wearable device 100. In this example, the user's field of view may represent what is visible to the user as the user views the ambient environment 400, for example through the lenses 107 of the head mounted wearable device 100. This user's field of view changes as, for example, the user changes/shifts head position, moves, and the like, causing a corresponding change to what is visible to the user. In this example, FIGS. 4B-4D illustrate the user view 405 through one of the lenses 107 of the head mounted wearable device 100 as the user walks along the sidewalk 410 towards the crosswalk 420, and then turns to cross at the crosswalk 420.

In the user view 405 shown in FIG. 4B, the user is walking along the sidewalk 410, towards the crosswalk 420. In FIG. 4B, content, in the form of a virtual object 450 output by the display device 104, is displayed to the user, providing route guidance. In the example shown in FIG. 4B, the virtual object 450 includes relatively detailed route guidance, including text instructions and estimated arrival time, streets, directional indicators and the like. In this example, the virtual object 450 including the relatively detailed route guidance may have been displayed in response to a determination that the user is in a situation in which the output of the virtual object 450 including the detailed route guidance, and any distraction associated with the output of the virtual object 450, is unlikely to compromise situational safety. This determination may be based on various different situational safety factors and/or combinations of situational safety factors. These factors may include, for example, detection of little to no pedestrian traffic on the sidewalk 410, no imminent turns in the route guidance provided by the virtual object 450, no automobile traffic detected in the imminent path of the user, a relatively clear path/no obstacles detected in the path of the user that could pose a hazard, and other such factors. The example shown in FIG. 4B represents a content output state of the wearable device 100 in which the environmental conditions in which the wearable device 100 is operating allow for the output of content in a relatively lenient manner.

In the user view 405 shown in FIG. 4C, the user is at substantially the same position on the sidewalk 410 as in FIG. 4B. However, in FIG. 4C, one or more obstacles, or impediments are detected in the path of the user. In the example shown in FIG. 4C, the example obstacles include pedestrian traffic on the sidewalk, in the path of the user, and a trash receptacle on the sidewalk, in the path of the user. In this situation, a virtual object 451 is output by the display device 104. The virtual object 451 shown in FIG. 4C includes modified, or simplified route guidance. The virtual object 451 shown in FIG. 4C is somewhat transparent, so that the user view 405 of the ambient environment 400 remains somewhat visible to the user through the virtual object 451. The modified, or simplified route guidance provided by the virtual object 451 may reduce distraction due to the display of the virtual object 451, allowing the user to maintain situational awareness and avoid the obstacles along the path, while still also maintaining awareness of the path to be followed according to the route guidance. This may improve situational safety during use of the wearable device 100. The example shown in FIG. 4C represents a content output state of the wearable device 100 in which the environmental conditions in which the wearable device 100 is operating warrant a change and/or additional control in the manner in which content is output.

In some examples, the system may identify one or more areas, or zones within the user view 405 of the ambient environment 400. Based on the context associated with the use of the wearable device 100, obstacles, hazards, and other items to be taken into consideration, the system may identify one or more of the areas or zones in which output of the information, for example in the form of the virtual object 451, may be displayed within the user view 405. Three example content display areas 480 are identified in FIG. 4C. The example content display areas 480 may correspond to areas, or portions of the user view 405 in which the display of the virtual object 451 is less likely to cause a distraction to the user of the wearable device 100 and/or occlude or obstruct the user's view of safety critical areas, thus allowing the user to maintain situational awareness/situational safety while using the wearable device 100.

In the user view 405 shown in FIG. 4C, the user is at substantially the same position on the sidewalk 410 as in FIG. 4B. However, in FIG. 4C, one or more obstacles, or impediments are detected in the path of the user. In the example shown in FIG. 4C, the example obstacles include pedestrian traffic on the sidewalk, in the path of the user, and a trash receptacle on the sidewalk, in the path of the user. In this situation, a virtual object 451 is output by the display device 104. The virtual object 451 shown in FIG. 4C includes modified, or simplified route guidance. The virtual object 451 shown in FIG. 4C is somewhat transparent, so that the user view 405 of the ambient environment 400 remains somewhat visible to the user through the virtual object 451. The modified, or simplified route guidance provided by the virtual object 451 may reduce distraction due to the display of the virtual object 451, allowing the user to maintain situational awareness and avoid the obstacles along the path, while still also maintaining awareness of the path to be followed according to the route guidance. This may improve situational safety during use of the wearable device 100.

As noted above, in some examples, the determination of whether or not to output information and/or in what manner to output information and/or in what position within the user view to output information, may be determined based on situational safety factors associated with the use of the wearable device 100. In some examples, these types of factors may be detected in, for example, image data captured by the image sensor 116 of the head mounted wearable device 100. The image data may include a portion of the ambient environment 400 in the path of the user, the area surrounding the user, and the like, which may provide a representation of situational safety factors to be taken into consideration. The image data may be processed by, for example, a classification engine (such as one or more classification engine(s) included in the additional resources 390 described above with respect to FIG. 3). Objects and/or patterns detected in the image data may be processed by, for example, one or more model(s), algorithm(s) and the like to determine a context in which the wearable device 100 is currently operating. In some examples, the determination of context may include, for example, a determination of location. This may include the processing of location data provided by the wearable device 100 and/or by the mobile device 200 paired with the wearable device 100. In some examples, the determination of context may include the processing of position and/or orientation data provided by corresponding sensors of the wearable device 100 and/or the mobile device 200. In some examples, position and/or orientation data may be representative of motions of the user corresponding to, for example checking traffic conditions, changing direction, starting/stopping motion, using rear view or side mirrors, and the like.

In some examples, the processing of the detected objects and/or patterns and/or location may provide an indication of the environment in which the wearable device 100 is currently operating, an activity in which the user is engaged, and the like, to determine context. In some examples, the processing of the detected objects and/or patterns and/or location may identify potential hazards in the vicinity of the user. In some examples, the processing of the detected objects and/or patterns and/or location and the corresponding context may be used to determine placement of the output of information in the user view 405. In some examples, the processing of the detected objects and/or patterns and/or location and the corresponding context may be used to determine areas within the user view 405 in which information (for example, in the form of a virtual object) may be displayed to the user without posing a hazard. In some examples, the processing of the detected objects and/or patterns and/or location and the corresponding context may be used to determine areas within the user view 405 in which display of information (for example, in the form of a virtual object) may pose a hazard to the user and/or those in the vicinity of the user.

In the user view 405 shown in FIG. 4D, the user has arrived at the corner of the sidewalk 410 and has turned to face the crosswalk 420, in preparation to cross the street. In FIG. 4D, the system has detected that the user has arrived at the crosswalk 420. The system may detect the user position at the crosswalk 420, in preparation to cross the street, and may suspend the display of information (for example, in the form of the virtual objects 450, 451). The user position at the crosswalk 420 may be detected based on, for example, processing and analysis of image data obtained by the image sensor 116 of the wearable device 100, location data provided by the wearable device 100 and/or the mobile device 200, and the like. For example, a pattern associated with the crosswalk 420 may be detected in the image data. One or more automobiles may be detected in the image data. Location data, including, for example, global positioning system data, traffic data, position and/or orientation data provided by corresponding sensors of the wearable device 100 and/or the mobile device 200, and the like, may provide information related to a level of hazard associated with walking and/or driving in the particular area. In the example shown in FIG. 4D, the system has suspended the display of information at this point to eliminate distraction in what is determined to be a situation that would benefit from the user's substantially undivided attention. That is, the system has suspended the display of information to allow the user to focus on environmental/situational safety issues such as oncoming vehicle traffic, pedestrian traffic, traffic signals and the like while crossing the street. In some examples, the system may resume the output of information/display of virtual objects (such as the route guidance provided by the example virtual objects 450 and 451) when it is determined that the situational safety considerations warrants resuming the output of information. The example shown in FIG. 4D represents a content output state of the wearable device 100 in which the environmental conditions in which the wearable device 100 is operating warrant additional changes and/or additional control in the manner in which content is output (compared to the content output state shown in FIG. 4C, i.e., a content output state in which content is not output by the wearable device 100, or the output of content is temporarily suspended or delayed).

FIG. 4C illustrates that the system may adapt or modify the display of information based on the context and surroundings in which the wearable device 100 is used. FIG. 4D illustrates that the system may delay, or temporarily suspend, the output of information based on the context and the surroundings in which the wearable device 100 is used. In some examples, the system may allow the output of some types of information, and delay the output of other types of information. The determination of whether to allow the output of information or delay the output of information may be associated with the context and surroundings in which the wearable device 100 is used, and the pertinence, or applicability of the information to be output relative to the context and surroundings. In the example situation illustrated in FIGS. 4A-4D, the system may determine that information in the form of route guidance is pertinent, or applicable to the current use of the wearable device 100, and may output that information when it is determined that the output of the information (for example, in the form of the virtual objects 450, 451) does not generate undue distraction and pose a safety hazard. In the example situation shown in FIGS. 4A-4D, the system may determine that another type of information, such as, for example, a notification of an incoming message, may not be pertinent, or applicable to the current use of the mobile device 100 and/or may generate an unnecessary distraction at the time of receipt. In this situation, the system may delay the output of that information (i.e., the display of a notification of an incoming message) until it is determined that the output of the information will not cause undue distraction and/or compromise situational safety.

FIGS. 5A-5E are third person views of a field of view of the user of the example wearable device 100. In particular, FIGS. 5A-5E are third person views of a user view 505 of an ambient environment 500 through one of the lenses 107 of the head mounted wearable device 100 as worn by the user. In this example, the user's field of view may represent what is visible to the user as the user views the ambient environment 500, for example through the lenses 107 of the head mounted wearable device 100. This field of view changes as, for example, the user changes/shifts head position, moves, and the like, causing a corresponding change to what is visible to the user. In this example, FIGS. 5A-5E illustrate the user view 505 through one of the lenses 107 of the head mounted wearable device 100, with the user seated in the driver's seat of a vehicle. In this example, the handheld mobile computing device 200 (not shown in FIGS. 5A-5E) may be with the user, for example, in a stored position in the interior of the vehicle. In some examples, the wearable device 100 and the mobile device 200 may be paired, or operably coupled. When in this state, the wearable device 100 and the mobile device 200 can communicate with each other, can exchange data and information, can share computing resources, and the like. In some examples, the wearable device 100 and the mobile device 200 may operate substantially independently.

In some examples, a context associated with the use of the wearable device 100 may be determined based on, for example, images captured by the image sensor 116 of the wearable device 100. In some examples, a context associated with the use of the wearable device 100 may be determined based on location data provided by the wearable device and/or the mobile device 200. In some examples, a context associated with the use of the wearable device 100 may be determined based on position and/or orientation data provided by sensors of the wearable device 100 and/or the mobile device 200. In some examples, the determination of whether or not to output information and/or in what manner to output information and/or in what position within the user view to output information, may be determined based on situational safety factors associated with the use of the wearable device 100. In some examples, these types of factors may be detected in the image data captured by the image sensor 116 of the head mounted wearable device 100, which may provide a representation of situational safety factors to be taken into consideration. The image data may be processed by, for example, a recognition engine (such as one or more recognition engine(s) included in the additional resources 390 described above with respect to FIG. 3). Objects and/or patterns detected in the image data may be processed by, for example, one or more model(s), algorithm(s) and the like to determine the context in which the wearable device 100 is currently operating. In some examples, the determination of context may include the processing of location data provided by the wearable device 100 and/or by the mobile device 200. In some examples, the determination of context may include the processing of the position and/or orientation data provided by corresponding sensors of the wearable device 100 and/or the mobile device 200, which may be representative of motions of the user corresponding to, for example checking traffic conditions, changing direction, starting/stopping motion, and the like.

For example, processing of the image data obtained by the image sensor 116 of the wearable device 100 may detect objects such as a steering wheel 510, a rearview mirror 520, a dashboard 530, an instrument cluster 540, a boundary 550 of a windshield 555, and other such objects. The detected positions and/or relative positions, of these objects in the image data may provide an indication that the user of the wearable device is in the driver's seat of the vehicle. Similarly, the objects such as, for example, boundaries 560 of the road 565, a dividing line 562 and the like may be detected. Processing of the location information provided by the wearable device 100 and/or the mobile device 200 may indicate that the vehicle is in motion, may provide information related to road and/or traffic conditions, upcoming hazards, and the like. Processing of the position and/or orientation sensors of the wearable device 100 and/or the mobile device 200 may provide an indication of changes in user position and/or orientation and/or gaze within the vehicle. This data may be used to develop a contextual understanding of the environment in which the wearable device 100 is operated. Thus, objects and/or patterns detected in the image data, and/or location data and/or position/orientation data provided by the sensors of the wearable device 100 and/or the mobile device 200 may provide an indication of the environment in which the wearable device 100 is currently operating, an activity in which the user is engaged, and the like, to determine context. For example, in the arrangement shown in FIGS. 5A-5E, based on the analysis of the data, it may be determined that the user of the wearable device 100 is in the driver's seat of the vehicle, and is the operator of the vehicle.

In some examples, the image data and/or the location data and/or the position/orientation data may be substantially continuously collected and substantially continuously processed, particularly as the vehicle moves, to identify potential hazards in the vicinity of the user. In some examples, the processing of the detected objects and/or patterns and/or location and/or position/orientation and the corresponding context may be used to determine placement of the output of information in the user view 505. In some examples, the processing of the detected objects and/or patterns and/or location and/or position/orientation and the corresponding context may be used to determine areas within the user view 505 in which information (for example, in the form of a virtual object) may be displayed to the user without causing an undue level of distraction, and without posing a hazard. In some examples, the processing of the detected objects and/or patterns and/or location and/or position/orientation data and the corresponding context may be used to determine areas within the user view 505 in which the display of information (for example, in the form of a virtual object) may pose a hazard to the user and/or those in the vicinity of the user. For example, the processing of the detected objects and/or patterns and/or location and/or position/orientation data and the corresponding context may be used to determine areas within the user view in which the display of information will not occlude portions of the user view 505 that allow for continued safe use of the wearable device 100. In the driving example shown in FIGS. 5A-5E, this type of data and analysis may provide for the determination of areas within the user view 505 in information can be displayed, while allowing the driver/user of the wearable device 100 to maintain situational awareness and situational safety.

Figure 5A:
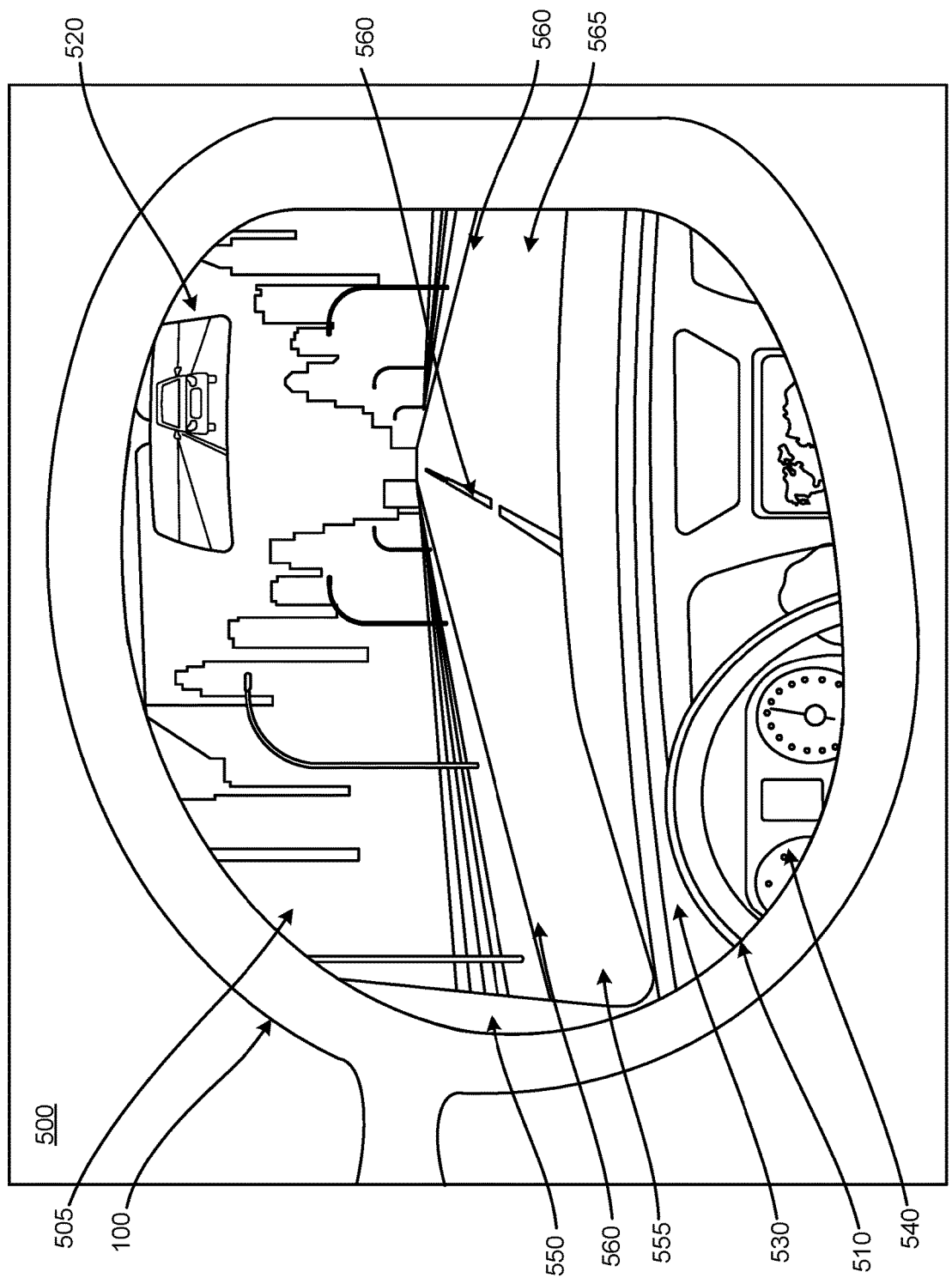
FIGS. 5A-5E illustrate operation of an example wearable device in a second example usage environment.
Figure 5B:
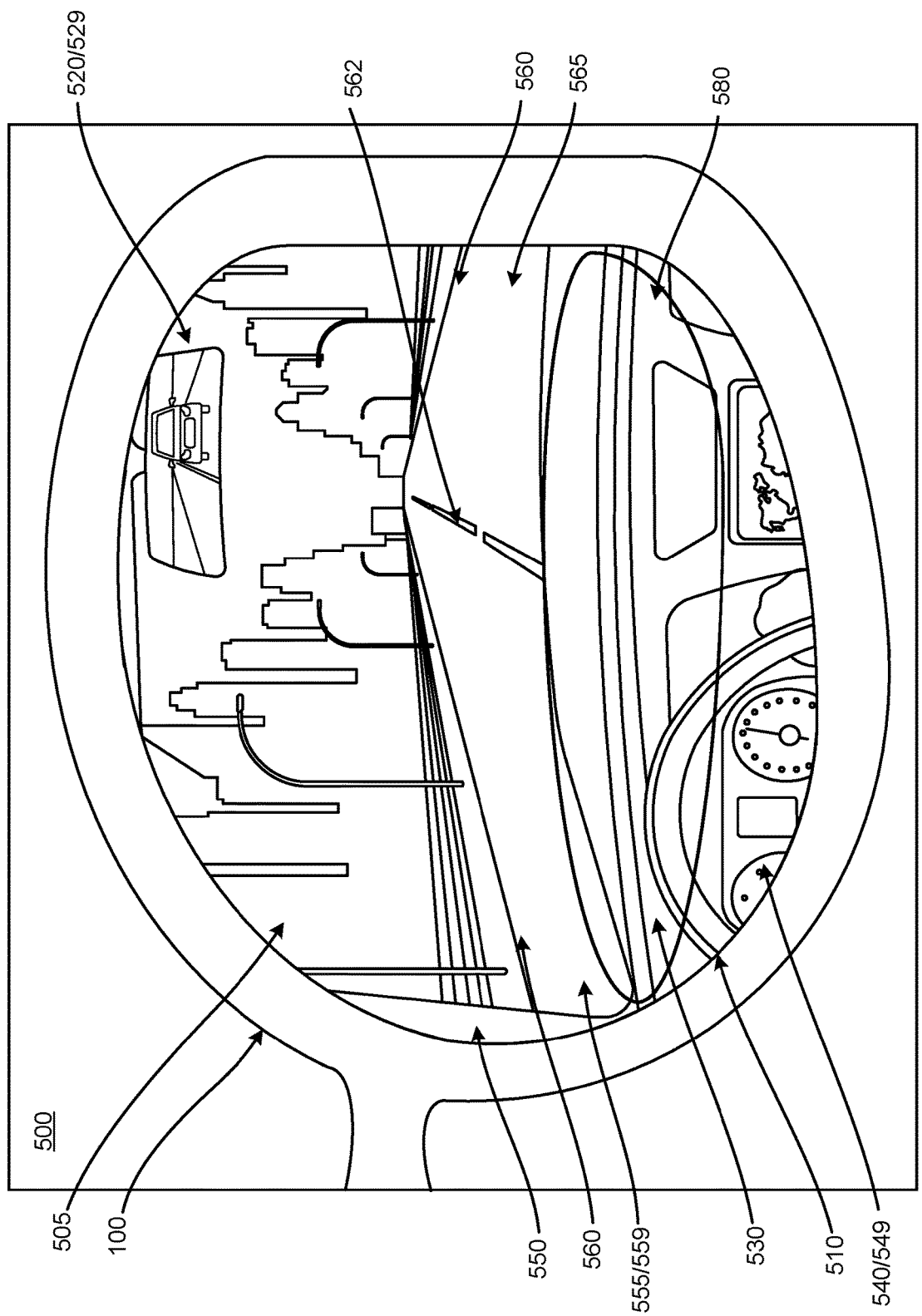
Figure 5C:
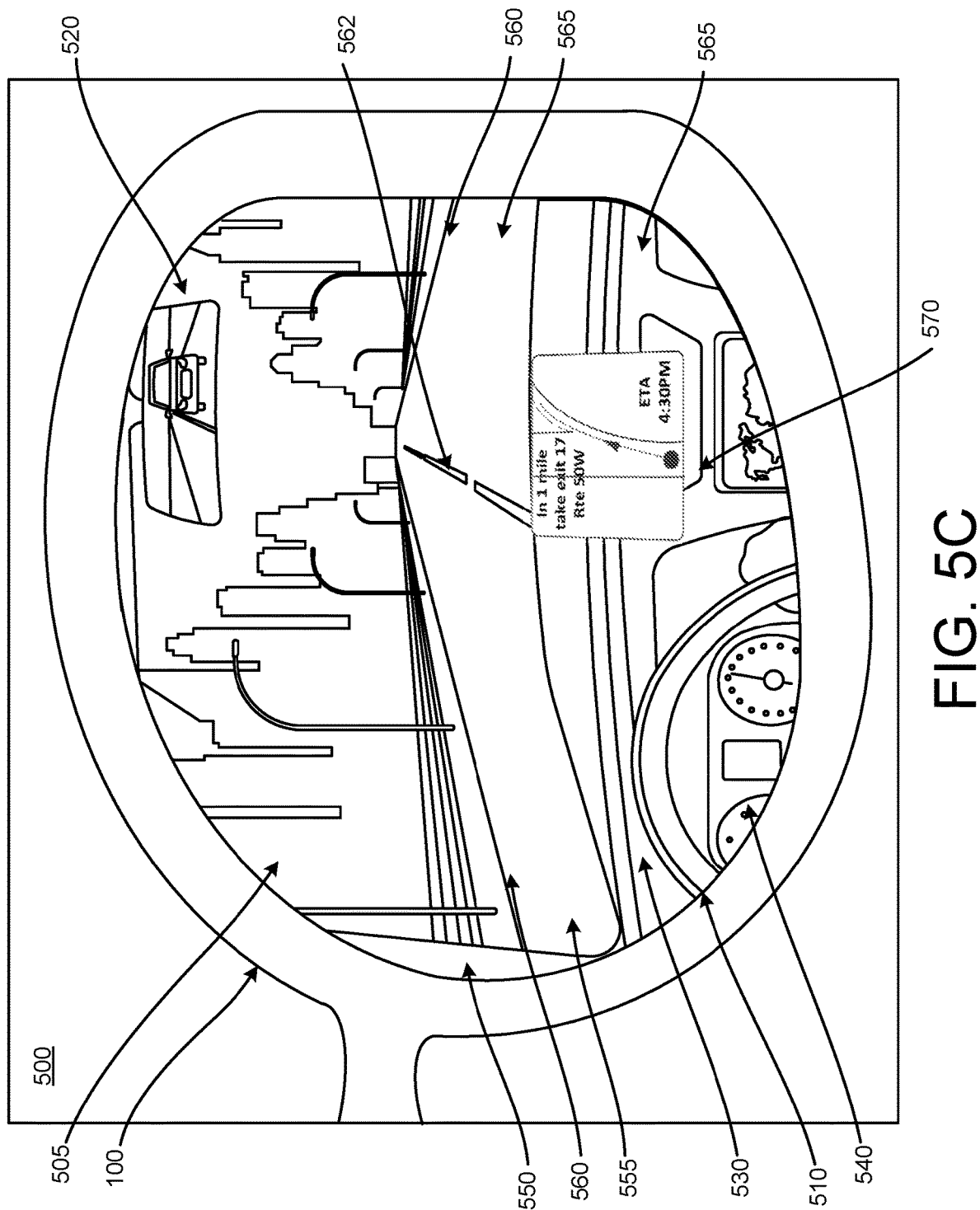

FIG. 5B illustrates an example content display area 580. The example content display area 580 may define an area, or zone, or portion of the user view 505 in which the display of information is less likely to cause a distraction to the user of the wearable device 100. The example content display area 580 may correspond to an area, or zone, or portion of the user view 505 in which the output of information (for example, in the form of a display of a virtual object) will not occlude or obstruct the user's view of safety critical areas, thus allowing the user to maintain situational awareness and situational safety while using the wearable device 100. One example content display area 580 is shown in FIG. 5B, for purposes of discussion and illustration. FIG. 5C illustrates the output of information, in the form of a virtual object 570, in the designated content display area 580.

In the example arrangement shown in FIGS. 5B and 5C, the content display area 580 corresponds to a portion of the dashboard 530. The output of information, for example, in the form of the display of the virtual object 570, in the designated content display area 580 will allow the user's view through the windshield 555, including peripheral portions of the windshield 555, to remain clear and unobstructed by the output of information. Similarly, the display of the virtual object 570 in the designated content display area 580 allows the user's view of the rear view mirror 520, and the user's view of the instrument cluster 540, to remain clear and unobstructed by the display of the virtual object 570. In some examples, one or more non-content display areas may be designated within the user view 505. The non-content display area(s) may correspond to portions of the user view 505 that are to remain clear and unobstructed. Thus, in the example shown in FIG. 5B, a portion of the user view 505 corresponding to the windshield 555 may be designated as a first non-content display area 559. A portion of the user view 505 corresponding to the rear view mirror 520 may be designated as a second non-content display area 529. A portion of the user view 505 corresponding to the instrument cluster 540 may be designated as a third non-content display area 549.

The output of information, for example, in the form of the virtual object 570, in the designated content display area 580 may reduce distraction to the user caused by the output of information. The output of information in the designated content display area 580 may allow remaining portions of the user view 505 (i.e., the non-content display areas 529, 549, 559) to remain clear and visible to the user of the wearable device 100. This may allow the user to maintain situational awareness and situational safety while using the wearable device 100 in this situation.

In the example shown in FIG. 5C, content, in the form of the virtual object 570 output by the display device 104, is displayed to the user in the content display area 580 of the user view 505. In this example, the content, in the form of the virtual object 570, provides route guidance. In the example shown in FIG. 5C, the virtual object 570 includes relatively detailed route guidance, including text instructions, exit number, estimated arrival time, a directional indicator and the like. In this example, the virtual object 570 including the relatively detailed rout guidance may have been displayed in response to a determination that the user is in a situation in which the output of the virtual object 570 including the detailed route guidance, and any distraction associated with the output of the virtual object 570, is unlikely to compromise situational safety. This determination may be based on various different situational safety factors and/or combinations of situational safety factors. In this particular example, these factors may include, for example, detection of little to no other vehicle traffic in the vicinity of the user, a relatively straight driving path/route ahead, no imminent turns/exits in the route guidance provided by the virtual object 570, no upcoming stops, obstacles, hazards, and other such factors. In some examples, these factors may be determined based on, for example, location data provided by the wearable device 100 and/or the mobile device 200 co-located with and in communication with the wearable device 100, image data obtained by the image sensor 116 of the wearable device 100, and other such data. In the example shown in FIGS. 5A-5C, the content output state of the wearable device 100, based on the context and environmental conditions in which the wearable device 100 is operating, dictate the controlled output of only content that is pertinent, or applicable to the current context (i.e., driving), and only in the designated content display area 580.

Figure 5D:
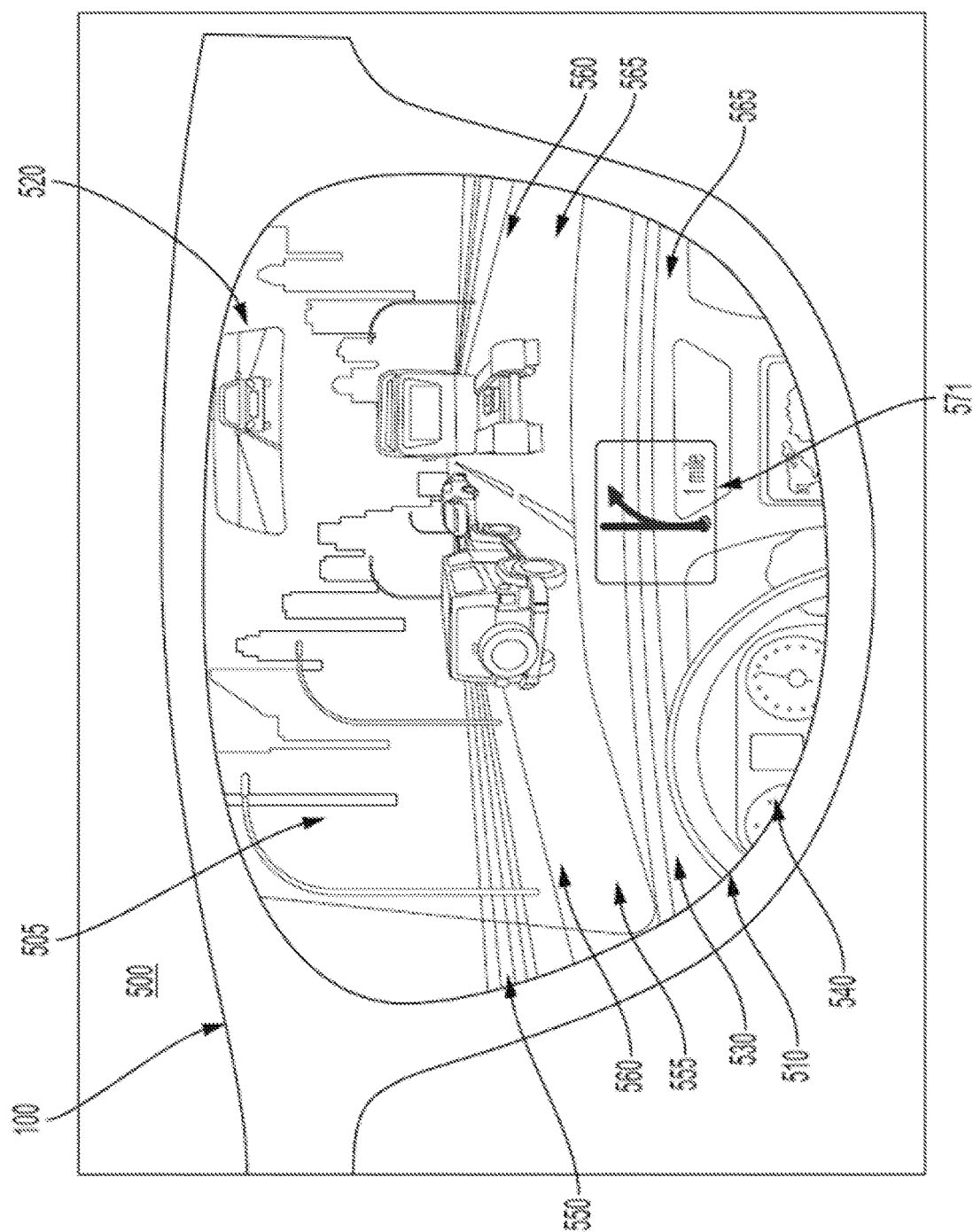

In the user view 505 shown in FIG. 5D, the user is at a similar position on road as in FIG. 5C. However, in FIG. 5D, one or more obstacles, or impediments are detected in the path of the user. That is, in the example shown in FIG. 5D, the road has become more heavily trafficked, potentially requiring more focus and attention by the user. In this situation, a virtual object 571 is output by the display device 104, and displayed within the content display area 580. The virtual object 571 shown in FIG. 5D includes modified, or simplified route guidance. The virtual object 571 shown in FIG. 5D is somewhat transparent, so that the user view 505 of the ambient environment 500 remains somewhat visible to the user through the virtual object 571. The modified, or simplified route guidance provided by the virtual object 571 may reduce distraction due to the display of the virtual object 571, allowing the user to maintain situational awareness as the user navigates the traffic, while still also maintaining awareness of the route to be followed according to the route guidance. This may improve situational safety during use of the wearable device 100 in this example situation. In the example shown in FIG. 5D, the content output state of the wearable device 100 may be based on the change in context, and change in environmental conditions in which the wearable device 100 is operating, thus warranting additional changes and/or additional controls in the manner in which content is output (compared to the content output state shown in FIG. 5C).

As noted above, in some examples, the determination of whether or not to output information and/or in what manner to output information and/or in what position within the user view to output information, may be determined based on a determination of context of use of the wearable device 100, and situational safety factors associated with the use of the wearable device 100 in the determined context. In the example described with respect to FIGS. 5A-5E, location data (for example, GPS data, associated traffic data, routing and the like) accessible via the wearable device 100 and/or by the mobile device 200 paired with the wearable device 100, may provide at least some of the data used by the model(s) and/or algorithm(s) in making the determination regarding the output of information. In some examples, the determination of context and whether or not to output information may include the processing of position and/or orientation data provided by corresponding sensors of the wearable device 100 and/or the mobile device 200. In some examples, position and/or orientation data may be representative of motions of the user corresponding to, for example checking traffic conditions, changing direction, starting/ stopping motion, and the like. In some examples, these types of factors may be detected in, for example, image data captured by the image sensor 116 of the head mounted wearable device 100, capturing the area surrounding the user. The location data and/or position/orientation data and/ or image data may be processed by, for example, model(s) and/or algorithm(s) (for example, available via the additional resources 390 described above with respect to FIG. 3).

Figure 5E:
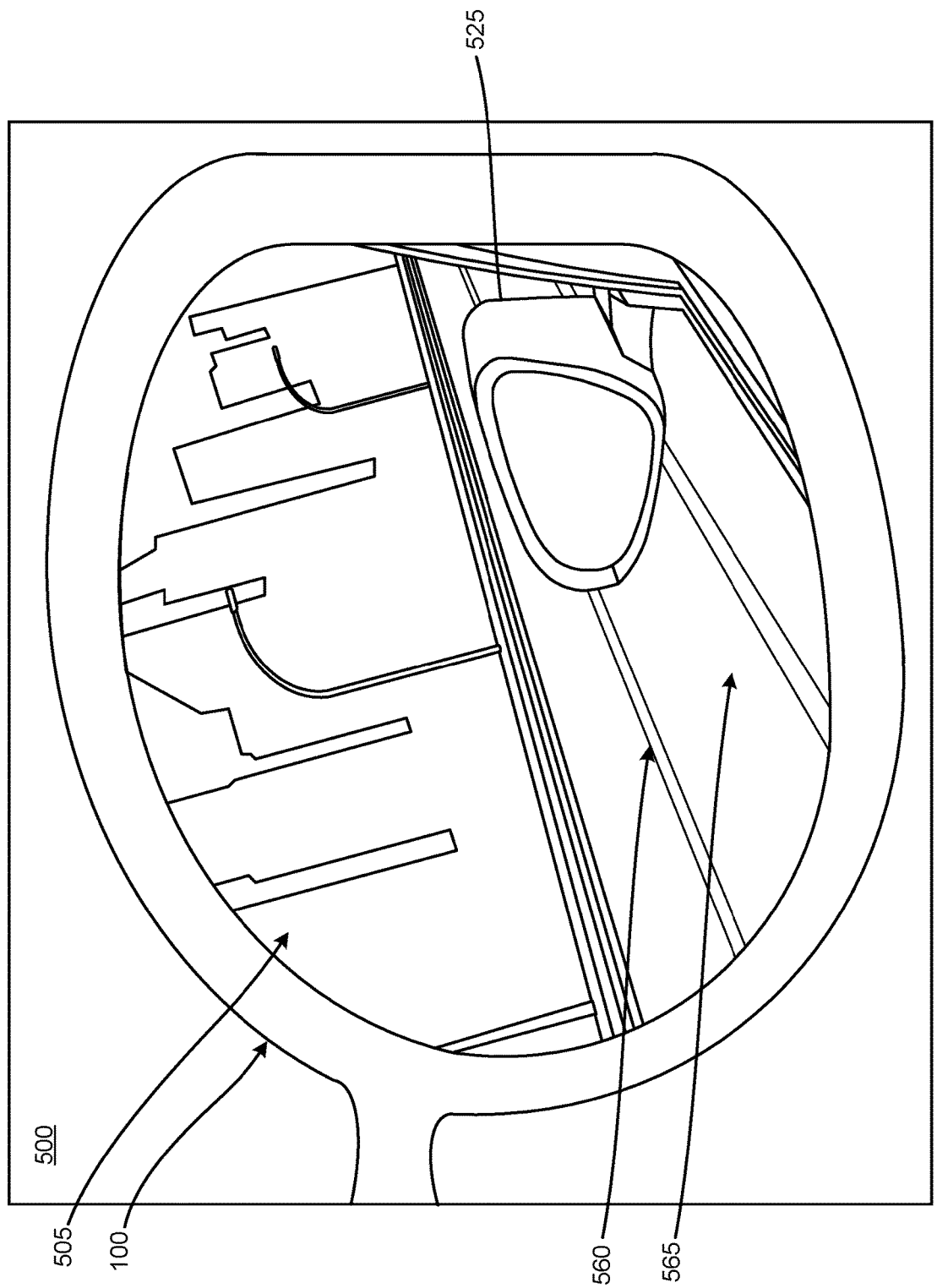

In the user view 505 shown in FIG. 5E, the user has (temporarily) turned his/her head away from the windshield 555, towards a side window, and side view mirror 525 of the vehicle. This movement may be indicative of, for example, the user performing a visual check of a blind spot, a visual check prior to changing lanes, and the like. In FIG. 5E, the system has detected this movement, and has determined that the user's attention may be (temporarily) directed to a particular task, and may suspend the display of information (for example, in the form of the virtual objects 570, 571). That is, in order to provide for user focus on the current task (i.e., checking the blind spot, changing lanes in this example), the system as (temporarily) suspended the output of information (i.e., the display of the virtual objects 570, 571). This may reduce distraction as the user performs the current task, and may ensure that the user's view is not occluded or obstructed due to the output of information while performing the task. In the example shown in FIG. 5E, the content output state of the wearable device 100 may be based on the change in context, and change in environmental conditions in which the wearable device 100 is operating, thus warranting additional changes and/or additional controls in the manner in which content is output (compared to the content output state shown in FIG. 5D).

In some examples, a determination of this type of shift in focus of the user may be determined based on data provided by the position and/or orientation sensor(s) of the wearable device 100 and/or the position and/or orientation sensor(s) of the mobile device 200 and/or image data provided by the image sensor 116 of the wearable device 100. In some examples, a determination of the shift in focus (based on a change in head orientation) may be made based on the data provided by the position and/or orientation sensor(s) of the wearable device 100, compared to the position/orientation data associated with the mobile device 200. In this example, the position/orientation data associated with the mobile device 200 may correspond to the position/orientation of the vehicle, and thus define a baseline position/orientation. A difference in the position/orientation of the data from the wearable device 100, from that baseline, may confirm that (in this example) the user has turned his/her head in the manner shown in FIG. 5E. This comparison to the baseline movement provided by the mobile device 200 may allow the system to distinguish between an actual, deliberate turn of the head by the user, and a change in position and/or orientation of the head of the user due to, for example, a turn of the vehicle (in which changes in position/orientation of the wearable device 100 would correspond to changes in position/orientation of the mobile device 200). In some examples, a determination of the shift in focus (based on a change in head orientation) may be made based on the data provided by the position and/or orientation sensor(s) of the wearable device 100, together with image data obtained by the image sensor 116 of the wearable device 100. That is, objects, patterns and the like detected in the image data (such as, for example, detection of the side view mirror 525 in the image data in this example) may be used to verify that the user has (temporarily) turned his/her head to check a blind spot, change lanes, and the like.

In some examples, a determination that the user has turned his/her head back again, to return focus through the windshield 555 (i.e., has shifted from the position shown in FIG. 5E back to the position shown in FIG. 5C or 5D) may be determined based on data provided by the position and/or orientation sensor(s) of the wearable device 100 and/or the position and/or orientation sensor(s) of the mobile device 200 and/or image data provided by the image sensor 116 of the wearable device 100 as described above. Upon detecting this return in focus, to the front of the vehicle, through the windshield 555, the system may again output information as shown in FIG. 5C and/or FIG. 5D.

FIGS. 5D and 5E illustrate that the system may adapt or modify the display of information based on the context and surroundings in which the wearable device 100 is used.

FIGS. 5D and 5E illustrate that the system may delay, or temporarily suspend, the output of information based on the context and the surroundings in which the wearable device 100 is used. In some examples, the system may allow the output of some types of information, and delay the output of other types of information. The determination of whether to allow the output of information or delay the output of information may be associated with the context and surroundings in which the wearable device 100 is used, and the pertinence, or applicability of the information to be output relative to the context and surroundings. In the example situation illustrated in FIGS. 5A-5E, the system may determine that information in the form of route guidance is pertinent, or applicable to the current use of the wearable device 100, and may output that information when it is determined that the output of the information (for example, in the form of the virtual objects 570, 571) does not generate undue distraction and/or pose a safety hazard.

In the example situation shown in FIGS. 5A-5E, the system may determine that another type of information, such as, for example, a notification of an incoming message, may not be pertinent, or applicable to the current use of the mobile device 100 and/or may generate an unnecessary distraction at the time of receipt. In this situation, the system may delay the output of that information (i.e., the display of a notification of an incoming message) until it is determined that the output of the information will not cause undue distraction and/or compromise situational safety. For example, the system may determine, based on, for example, location data provided by the wearable device 100 and/or the mobile device 200, position and/or orientation data provided by the wearable device and/or the mobile device 200, that the vehicle has stopped, and may output other types of information (notifications, updates, information requested by the user, and the like) until it is determined that the vehicle is once again in motion. The system may determine, based on, for example, image data provided by the wearable device 100, that the user of the wearable device 100 is in the passenger's seat (rather than the driver's seat) and may output information to the user in accordance with different parameters than when in the driver's seat.

FIGS. 4A-4D illustrate the application of the principles described herein to the use of the example head mounted wearable device 100 while walking. FIGS. 5A-5E illustrate the application of the principles described herein to the use of the example head mounted display device 100 while driving. The principles described herein may be applied to the use of the example head mounted wearable device 100 in other environments in which reduced distraction may improve the user experience and enhance situational safety. Similarly, the principles described herein may be applied to the use of other types of wearable devices, in the described example environments, and other environments, in which reduced user distraction may improve the user experience and enhance situational safety.

FIGS. 4A-4D and 5A-5E present examples in which the output of visual content is modified and/or (temporarily) suspended based on an analysis of detected safety factors and considerations in a particular context in which the wearable device 100 is used. In the examples shown in FIGS. 4A-5E, the output of content is modified, for example, simplified, or temporarily suspended, to reduce distraction in situations in which the situational safety considerations warrant such modification/suspension of the output of the visual content. In some examples, the visual content may be replaced with audible content to reduce distraction that may be generated due to the output of visual content in a particular situation. For example, audible content may be output in lieu of visual content in a situation in which the output of visual content, even in a modified/simplified manner, may occlude safety critical features in the user's field of view.

Figure 6:
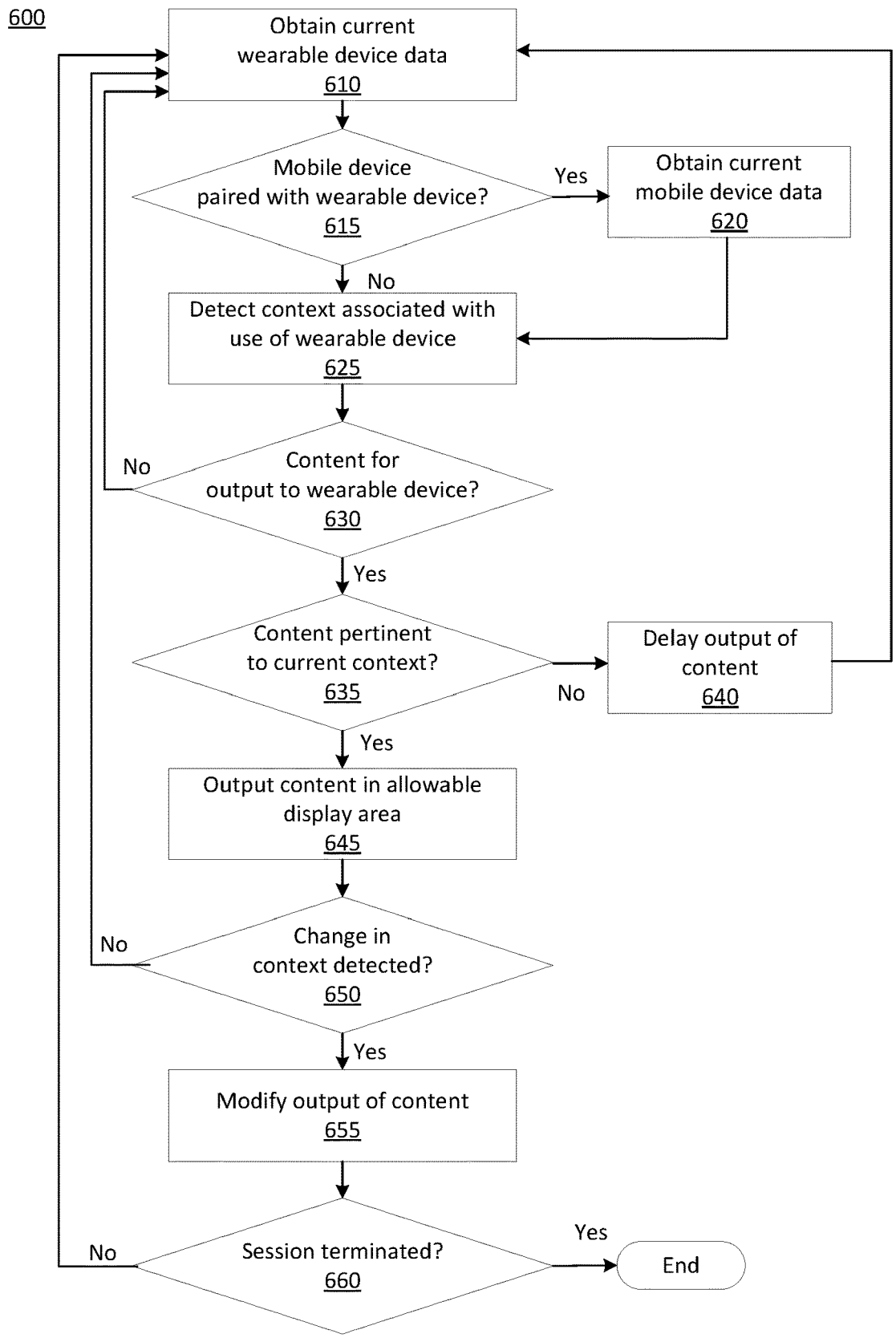
FIG. 6 is a flowchart of an example method, in accordance with implementations described herein.

FIG. 6 is a flowchart of an example method 600 of managing the output of content in a wearable device, in accordance with implementations described herein. As noted above, content may be output to a user by a wearable device, such as the head mounted wearable device 100 described above, based on a context associated with the use of the wearable device, to reduce distraction and to maintain situational awareness and situational safety during use of the wearable device. The example method 600 illustrates operations performed in sequential order, for purposes of discussion and illustration. Operations may be executed in a different order than show, or in a parallel or overlapping manner.

Data associated with the wearable device may be collected as the wearable device is operated (block 610). The data may include, for example, location data associated with the wearable device, position and/or orientation data associated with the wearable device, image data obtained by an image sensor of the wearable device, capturing images of an environment in which the wearable device is operated, and other such data. If it is determined that a mobile device, such as the handheld mobile computing device 200 described above, is paired with, or operably coupled with the wearable device (block 615), data associated with the mobile device may also be collected (block 620). The data may similarly include, for location data associated with the mobile device, position and/or orientation data associated with the mobile device, image data obtained by an image sensor of the mobile device, and other such data.

A context associated with the use of the wearable device may be determined based on the data associated with the wearable device, alone or in combination with the data associated with the mobile device (block 625). The context may provide, for example, a characterization of the environment in which the wearable device is operated, safety factors to be taken into consideration in the operation of the wearable device in the current environment, and the like. In response to a determination that content is available for output by the wearable device (block 630), and that the content is pertinent, or applicable to the determined context (block 635), the content may be output by the wearable device (block 645). The content may be output in an allowable, or designated content display area of the wearable device, which will allow for the output of the content with minimal distraction to the user, minimal occlusion of the user's view of the ambient environment, and the like. In response to a determination that the content is not pertinent to the determined context, output of the content may be delayed (block 640), so as to minimize unnecessary distraction. In response to a detected change in context (block 650), a form and/or a manner in which the content is output may be modified (block 655). A detected change in content may indicate a change in user focus, driving a need for a change in how the content is output. Modification of the form and/or the manner in which the content is output may include, for example, a visual change in how the content is output, a level of detail included in the output of the content, change in output position of the content, a suspension of the output of the content, and the like. The process may repeat until a use session of the wearable device is terminated (block 660).

Figure 7:
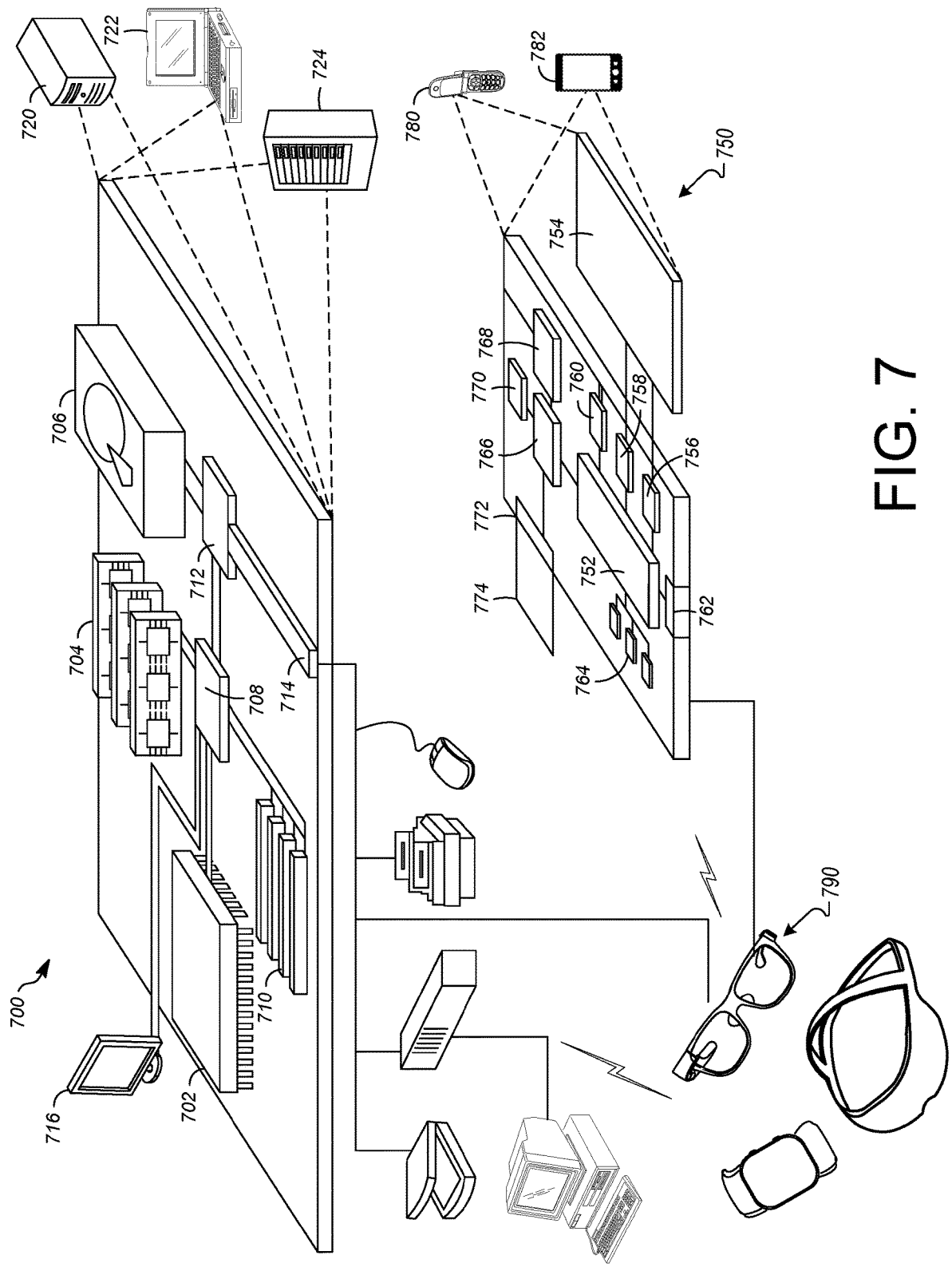
FIG. 7 illustrates example computing devices of the computing systems discussed herein.

FIG. 7 illustrates an example of a computer device 700 and a mobile computer device 750, which may be used with the techniques described here. The computing device 700 includes a processor 702, memory 704, a storage device 706, a high-speed interface 708 connecting to memory 704 and high-speed expansion ports 710, and a low-speed interface 712 connecting to low-speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high-speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high-speed controller 708 manages bandwidth-intensive operations for the computing device 700, while the low-speed controller 712 manages lower bandwidth-intensive operations. Such allocation of functions is an example only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display), and LED (Light Emitting Diode) or an OLED (Organic Light Emitting Diode) display, or other appropriate display technology. The display interface 756 may include appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In-Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in the figure can include sensors that interface with an AR headset/HMD device 790 to generate an augmented environment for viewing inserted content within the physical space. For example, one or more sensors included on a computing device 750 or other computing device depicted in the figure, can provide input to the AR headset 790 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 750 can use the sensors to determine an absolute position and/or a detected rotation of the computing device in the AR space that can then be used as input to the AR space. For example, the computing device 750 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer. In some implementations, the user can aim at a target location using a virtual laser pointer.

In some implementations, one or more input devices included on, or connect to, the computing device 750 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 750 when the computing device is incorporated into the AR space can cause a particular action to occur in the AR space.

In some implementations, a touchscreen of the computing device 750 can be rendered as a touchpad in AR space. A user can interact with the touchscreen of the computing device 750. The interactions are rendered, in AR headset 790 for example, as movements on the rendered touchpad in the AR space. The rendered movements can control virtual objects in the AR space.

In some implementations, one or more output devices included on the computing device 750 can provide output and/or feedback to a user of the AR headset 790 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 750 may appear as another object in a computer-generated, 3D environment. Interactions by the user with the computing device 750 (e.g., rotating, shaking, touching a touchscreen, swiping a finger across a touch screen) can be interpreted as interactions with the object in the AR space. In the example of the laser pointer in an AR space, the computing device 750 appears as a virtual laser pointer in the computer-generated, 3D environment. As the user manipulates the computing device 750, the user in the AR space sees movement of the laser pointer. The user receives feedback from interactions with the computing device 750 in the AR environment on the computing device 750 or on the AR headset 790. The user's interactions with the computing device may be translated to interactions with a user interface generated in the AR environment for a controllable device.

In some implementations, a computing device 750 may include a touchscreen. For example, a user can interact with the touchscreen to interact with a user interface for a controllable device. For example, the touchscreen may include user interface elements such as sliders that can control properties of the controllable device.

Computing device 700 is intended to represent various forms of digital computers and devices, including, but not limited to laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be examples only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-implemented method, comprising:
   determining a context associated with operation of a head mounted wearable device;
   determining a content output state of the head mounted wearable device based on the context and one or more situational safety factors associated with the context; and
   outputting content, by a display device of the head mounted wearable device, based on the content output state of the head mounted wearable device, including:
      in a first content output state:
         outputting the content in a portion of a display area of the display device of the head mounted wearable device identified as a designated content display area based on the context and the one or more situational safety factors associated with the operation of the head mounted wearable device; and
         restricting output of content in a portion of the display area of the display device of the head mounted wearable device identified as a content non-display area based on the context and the one or more situational safety factors associated with the operation of the head mounted wearable device; and
      in a second content output state, delaying output of the content based on the context and the one or more situational safety factors associated with the operation of the head mounted wearable device.

2. The computer-implemented method of claim 1, wherein determining the context includes:
   obtaining data associated with the head mounted wearable device, the data including at least one of:
      location data provided by the head mounted wearable device;
      image data provided by an image sensor of the head mounted wearable device;
      acceleration data provided by an inertial measurement unit of the head mounted wearable device; or position and orientation data provided by a position and orientation sensor of the head mounted wearable device.

3. The computer-implemented method of claim 2, wherein
obtaining the data associated with the head mounted wearable device includes obtaining at least one of location data, image data, position data, orientation data or acceleration data from a mobile computing device that is paired with the head mounted wearable device.

4. The computer-implemented method of claim 1, further comprising:
determining applicability of the content to the context associated with the operation of the head mounted wearable device;
outputting the content in response to a determination that the content is applicable to the context; and
delaying output of the content in response to a determination that the content is not applicable to the context.

5. The computer-implemented method of claim 1, wherein outputting the content includes:
identifying one or more portions of the display area of the display device of the head mounted wearable device as one or more designated content display areas;
displaying the content only in the one or more designated content display areas;
identifying remaining portions of the display area of the display device of the head mounted wearable device as content non-display areas; and
restricting display of content in the content non-display areas, such than an ambient environment is visible through the content non-display areas.

6. The computer-implemented method of claim 5, wherein designating the remaining portions of the display area of the display device of the head mounted wearable device as content non-display areas includes:
designating portions of the display area of the display device of the head mounted wearable device corresponding to the one or more situational safety factors associated with operation of the head mounted wearable device in the ambient environment as content non-display areas; and
restricting display of content in the content non-display areas so as to maintain a user view of the ambient environment through the content non-display areas.

7. The computer-implemented method of claim 1, further comprising:
detecting a change in the context in which the head mounted wearable device is operated;
updating the context; and
updating the content output state of the head mounted wearable device based on the updated context.

8. The computer-implemented method of claim 7, further comprising:
modifying a manner in which the content is output based on the updated context and the updated content output state.

9. The computer-implemented method of claim 8, wherein modifying the manner in which the content is output includes at least one of:
simplifying an appearance of the content in response to a detected change in the one or more situational safety factors;
changing a display position of the content in response to a detected change in the one or more situational safety factors;
suspending output of the content in response to a detected change in the one or more situational safety factors; or
resuming output of the content in response to a detected change in the one or more situational safety factors.

10. The computer-implemented method of claim 1, wherein the first content output state is a state in which content is output only in the designated content display area to maintain situational safety based on the context in which the head mounted wearable device is operated and the one or more situational safety factors associated with operation of the head mounted wearable device.

11. The computer-implemented method of claim 1, wherein the second content output state is a state in which the delaying of the output of content maintains situational safety based on the context in which the head mounted wearable device is operated and the one or more situational safety factors associated with the operation of the head mounted wearable device.

12. A non-transitory computer-readable medium storing executable instructions that, when executed by at least one processor of a computing device, are configured to cause the at least one processor to:
determine a context associated with operation of a head mounted wearable device;
determine a content output state of the head mounted wearable device based on the context and one or more situational safety factors associated with the context; and
output content, by a display device of the head mounted wearable device, based on the content output state of the head mounted wearable device, including:
in a first content output state:
output the content in a portion of a display area of the display device of the head mounted wearable device identified as a designated content display area based on the context and the one or more situational safety factors associated with the operation of the head mounted wearable device; and
restrict output of content in a portion of the display area of the display device of the head mounted wearable device identified as a content non-display area based on the context and the one or more situational safety factors associated with the operation of the head mounted wearable device; and
in a second content output state, delay output of the content based on the context and the one or more situational safety factors associated with the operation of the head mounted wearable device.

13. The non-transitory computer-readable medium of claim 12, wherein the instructions cause the at least one processor to:
obtain data associated with the head mounted wearable device, the data including at least one of:
location data provided by at least one of the head mounted wearable device or a mobile computing device paired with the head mounted wearable device;
image data provided by an image sensor of the head mounted wearable device;
acceleration data provided by an inertial measurement unit of the head mounted wearable device; or
position and orientation data provided by a position and orientation sensor of at least one or the head mounted wearable device or the mobile computing device.

14. The non-transitory computer-readable medium of claim 12, wherein the instructions cause the at least one processor to:
   determine applicability of the content to the context associated with the operation of the head mounted wearable device;
   output the content in response to a determination that the content is applicable to the context; and
   delay output of the content in response to a determination that the content is not applicable to the context.

15. The non-transitory computer-readable medium of claim 12, wherein the instructions cause the at least one processor to:
   identify one or more portions of the display area of the display device of the head mounted wearable device as one or more designated content display areas;
   display the content only in the one or more designated content display areas;
   identify remaining portions of the display area of the display device of the head mounted wearable device as content non-display areas; and
   restrict display of content in the content non-display areas, such than an ambient environment is visible through the content non-display areas.

16. The non-transitory computer-readable medium of claim 15, wherein the instructions cause the at least one processor to:
   designate portions of the display area of the display device of the head mounted wearable device corresponding to the one or more situational safety factors associated with operation of the head mounted wearable device in the ambient environment as content non-display areas; and
   restrict display of content in the content non-display areas so as to maintain a user view of the ambient environment through the content non-display areas.

17. The non-transitory computer-readable medium of claim 12, wherein the instructions cause the at least one processor to:
   detect a change in the context in which the head mounted wearable device is operated;
   update the context;
   update the content output state of the head mounted wearable device based on the updated context; and
   modify a manner in which the content is output based on the updated context and the updated content output state.

18. The non-transitory computer-readable medium of claim 17, wherein the instructions cause the at least one processor to modify the manner in which the content is output, including:
   simplify an appearance of the content in response to a detected change in the one or more situational safety factors;
   change a display position of the content in response to a detected change in the one or more situational safety factors;
   suspend output of the content in response to a detected change in the one or more situational safety factors; or
   resume output of the content in response to a detected change in the one or more situational safety factors.

19. The non-transitory computer-readable medium of claim 12, wherein the first content output state is a state in which content is output only in the designated content display area to maintain situational safety based on the context in which the head mounted wearable device is operated and the one or more situational safety factors associated with operation of the head mounted wearable device.

20. The non-transitory computer-readable medium of claim 12, wherein the second content output state is a state in which output of content is delayed to maintain situational safety based on the context in which the head mounted wearable device is operated and the one or more situational safety factors associated with the operation of the head mounted wearable device.

* * * * *